(12) United States Patent
Tubilla et al.

(10) Patent No.: US 11,978,072 B2
(45) Date of Patent: May 7, 2024

(54) SYSTEMS FOR MANAGEMENT OF LOCATION-AWARE MARKET DATA

(71) Applicant: Indigo Ag, Inc., Charlestown, MA (US)

(72) Inventors: Fernando Tubilla, Milton, MA (US); Nicholas Malizia, Maynard, MA (US)

(73) Assignee: INDIGO AG, INC., Charlestown, MA (US)

( * ) Notice: Subject to any disclaimer, the term of this patent is extended or adjusted under 35 U.S.C. 154(b) by 0 days.

(21) Appl. No.: 18/154,643

(22) Filed: Jan. 13, 2023

(65) Prior Publication Data

US 2023/0177545 A1   Jun. 8, 2023

Related U.S. Application Data

(63) Continuation of application No. PCT/US2022/041518, filed on Aug. 25, 2022.

(60) Provisional application No. 63/238,539, filed on Aug. 30, 2021.

(51) Int. Cl.
    *G06Q 30/0204*   (2023.01)

(52) U.S. Cl.
    CPC ............... *G06Q 30/0205* (2013.01)

(58) Field of Classification Search
    CPC .................................. G06Q 30/0205
    USPC ..................................... 705/7.34
    See application file for complete search history.

(56) References Cited

U.S. PATENT DOCUMENTS

| | | | |
|---|---|---|---|
| 4,674,044 A | 6/1987 | Kalmus et al. | |
| 4,677,552 A | 6/1987 | Sibley, Jr. | |
| 4,903,201 A | 2/1990 | Wagner et al. | |
| 5,063,507 A | 11/1991 | Lindsey et al. | |
| 5,077,665 A | 12/1991 | Silverman et al. | |
| 5,136,501 A | 8/1992 | Silverman et al. | |
| 5,285,383 A | 2/1994 | Lindsey et al. | |
| 5,297,031 A | 3/1994 | Gutterman et al. | |

(Continued)

FOREIGN PATENT DOCUMENTS

| EP | 1389767 A1 | 2/2004 |
|---|---|---|
| EP | 3046066 A1 | 7/2016 |

(Continued)

OTHER PUBLICATIONS

Location difference of multiple distances based k-nearest neighbors algorithm. Knowledge-Based Systems. vol. 90, Dec. 2015, pp. 99-110.*

(Continued)

*Primary Examiner* — Timothy Padot
(74) *Attorney, Agent, or Firm* — Fenwick & West LLP

(57) ABSTRACT

A method of generating a visualization of location-dependent values is provided where a plurality of bids and a plurality of supply locations are received from at least one datastore. Each of the plurality of bids has an associated location. A first geographic location is selected from the plurality of supply locations. A ball tree is generated, the ball tree comprising a plurality of nodes, each node of the ball tree comprising a pivot geographic location and a radius, each node corresponding to at least one local value having a location within the radius of the pivot. The ball tree is traversed to generate sorted collection of location dependent values. Each of the location dependent values is determined from one of the plurality of bids. A map of the collection of location dependent values is output.

30 Claims, 15 Drawing Sheets

(56) References Cited

U.S. PATENT DOCUMENTS

| | | | |
|---|---|---|---|
| 5,706,442 | A | 1/1998 | Anderson et al. |
| 5,715,402 | A | 2/1998 | Popolo |
| 5,727,165 | A | 3/1998 | Ordish et al. |
| 5,732,400 | A | 3/1998 | Mandler et al. |
| 5,775,734 | A | 7/1998 | George, Jr. |
| 5,787,156 | A | 7/1998 | Katz |
| 5,794,207 | A | 8/1998 | Walker et al. |
| 5,845,266 | A | 12/1998 | Lupien et al. |
| 5,873,071 | A | 2/1999 | Ferstenberg et al. |
| 5,884,286 | A | 3/1999 | Daugherty, III |
| 5,924,082 | A | 7/1999 | Silverman et al. |
| 5,930,767 | A | 7/1999 | Reber et al. |
| 5,960,411 | A | 9/1999 | Hartman et al. |
| 5,970,479 | A | 10/1999 | Shepherd |
| 6,104,643 | A | 1/2000 | Minton |
| 6,058,379 | A | 5/2000 | Odom et al. |
| 6,131,087 | A | 10/2000 | Luke et al. |
| 6,134,535 | A | 10/2000 | Belzberg |
| 6,242,474 | B1 | 8/2001 | Garcia |
| 6,317,728 | B1 | 11/2001 | Kane |
| 6,338,050 | B1 | 1/2002 | Conklin et al. |
| 6,390,472 | B1 | 5/2002 | Vinarsky |
| 6,393,406 | B1 | 5/2002 | Eder |
| 6,401,041 | B1 | 5/2002 | Peterson |
| 6,418,419 | B1 | 7/2002 | Nieboer et al. |
| 6,422,508 | B1 | 7/2002 | Barnes |
| 6,584,451 | B1 | 6/2003 | Shoham et al. |
| 6,598,027 | B1 | 7/2003 | Breen et al. |
| 6,622,129 | B1 | 9/2003 | Whitworth |
| 6,673,479 | B2 | 1/2004 | McArthur et al. |
| 6,865,582 | B2 | 3/2005 | Obradovic et al. |
| 6,988,083 | B2 | 1/2006 | Dines et al. |
| 7,076,452 | B2 | 7/2006 | Florence et al. |
| 7,080,034 | B1 | 7/2006 | Reams |
| 7,318,045 | B2 | 1/2008 | Baecker et al. |
| 7,349,879 | B2 | 3/2008 | Alsberg et al. |
| 7,418,423 | B2 | 8/2008 | Reding et al. |
| 7,742,979 | B2 | 6/2010 | Reding et al. |
| 7,797,205 | B2 | 9/2010 | Song et al. |
| 7,974,853 | B1 | 7/2011 | Zimmerman |
| 8,019,694 | B2 | 9/2011 | Fell et al. |
| 8,352,494 | B1 * | 1/2013 | Badoiu ............... G06F 16/5838 707/780 |
| 8,965,812 | B2 | 2/2015 | Linville |
| 9,113,590 | B2 | 8/2015 | Johnson |
| 9,381,646 | B1 | 7/2016 | Fryshman |
| 9,489,576 | B2 | 11/2016 | Johnson et al. |
| 9,519,861 | B1 | 12/2016 | Gates et al. |
| 9,563,945 | B2 | 2/2017 | Fryshman |
| 9,582,002 | B2 | 2/2017 | Cavender-Bares |
| 9,582,873 | B2 | 2/2017 | Ulman |
| 9,629,306 | B2 | 4/2017 | Sauder et al. |
| 9,652,840 | B1 | 5/2017 | Shriver et al. |
| 9,658,201 | B2 | 5/2017 | Redden et al. |
| 9,745,060 | B2 | 8/2017 | O'Connor et al. |
| 9,756,844 | B2 | 9/2017 | Groeneveld |
| 9,974,226 | B2 | 5/2018 | Rupp et al. |
| RE46,968 | E | 7/2018 | Linville |
| RE47,742 | E | 11/2019 | Linville |
| 10,564,316 | B2 | 2/2020 | Xu et al. |
| 11,069,005 | B2 | 7/2021 | Ethington et al. |
| 11,100,579 | B1 | 8/2021 | Raguse et al. |
| 11,170,453 | B2 | 11/2021 | Perry et al. |
| 11,263,707 | B2 | 3/2022 | Perry et al. |
| 11,367,093 | B2 | 6/2022 | Perry et al. |
| 11,657,903 | B2 | 5/2023 | McBratney et al. |
| 11,670,401 | B2 | 6/2023 | McBratney et al. |
| 2001/0032162 | A1 | 10/2001 | Alsberg et al. |
| 2001/0032165 | A1 | 10/2001 | Friend et al. |
| 2001/0034663 | A1 | 10/2001 | Teveler et al. |
| 2002/0025330 | A1 | 1/2002 | May |
| 2002/0023038 | A1 | 2/2002 | Fritsch et al. |
| 2002/0023039 | A1 | 2/2002 | Fritsch et al. |
| 2002/0032644 | A1 | 3/2002 | Corby et al. |
| 2002/0059091 | A1 | 5/2002 | Hay et al. |
| 2002/0065765 | A1 | 5/2002 | Shuler et al. |
| 2002/0087453 | A1 | 7/2002 | Nicolaisen et al. |
| 2002/0095369 | A1 | 7/2002 | Kaplan et al. |
| 2002/0120555 | A1 | 8/2002 | Lerner |
| 2002/0138393 | A1 | 9/2002 | Tatge |
| 2002/0147670 | A1 | 10/2002 | Lange |
| 2002/0183867 | A1 | 12/2002 | Gupta et al. |
| 2002/0184135 | A1 | 12/2002 | Zakaria |
| 2002/0194115 | A1 | 12/2002 | Nordlicht et al. |
| 2003/0019408 | A1 | 1/2003 | Fraisse et al. |
| 2003/0050901 | A1 | 3/2003 | Jester et al. |
| 2003/0084791 | A1 | 5/2003 | Trenhaile et al. |
| 2003/0195822 | A1 | 10/2003 | Tatge |
| 2003/0236738 | A1 | 12/2003 | Lange et al. |
| 2004/0024648 | A1 | 2/2004 | Tatge |
| 2005/0114252 | A1 | 5/2005 | Beurskens |
| 2005/0137964 | A1 | 6/2005 | Nordlicht et al. |
| 2005/0234691 | A1 | 10/2005 | Singh et al. |
| 2006/0111845 | A1 | 5/2006 | Forbis et al. |
| 2006/0259417 | A1 | 11/2006 | Marynowski et al. |
| 2006/0271262 | A1 | 11/2006 | McLain |
| 2008/0033864 | A1 | 2/2008 | McDonough |
| 2008/0215167 | A1 | 9/2008 | Beck |
| 2008/0313013 | A1 | 12/2008 | Fell et al. |
| 2010/0106653 | A1 | 4/2010 | Sandholm et al. |
| 2010/0114753 | A1 | 5/2010 | Osmanski et al. |
| 2010/0332430 | A1 | 12/2010 | Caraviello et al. |
| 2011/0208636 | A1 * | 8/2011 | Bachu ................... G06Q 30/06 705/37 |
| 2011/0290873 | A1 | 12/2011 | Nishiguchi et al. |
| 2012/0116943 | A1 | 5/2012 | Abramson |
| 2012/0246050 | A1 | 9/2012 | McNew |
| 2013/0197814 | A1 | 8/2013 | McBratney et al. |
| 2013/0322733 | A1 * | 12/2013 | Tarnowski ............. G06F 18/40 382/141 |
| 2013/0332205 | A1 | 12/2013 | Friedberg et al. |
| 2014/0039967 | A1 | 2/2014 | Scharf et al. |
| 2014/0095261 | A1 | 4/2014 | Johnson |
| 2014/0108663 | A1 * | 4/2014 | Peters ..................... H04L 47/70 709/226 |
| 2014/0222374 | A1 | 8/2014 | Lock et al. |
| 2014/0229258 | A1 | 8/2014 | Seriani |
| 2014/0263822 | A1 | 9/2014 | Malveaux |
| 2015/0242970 | A1 | 8/2015 | Avey et al. |
| 2015/0370935 | A1 | 12/2015 | Starr |
| 2015/0371324 | A1 | 12/2015 | Kumar |
| 2016/0050840 | A1 | 2/2016 | Sauder et al. |
| 2016/0071410 | A1 | 3/2016 | Rupp et al. |
| 2016/0073573 | A1 | 3/2016 | Ethington et al. |
| 2016/0157414 | A1 | 6/2016 | Ackerman et al. |
| 2016/0171680 | A1 | 6/2016 | Lobell |
| 2016/0179994 | A1 | 6/2016 | Levine et al. |
| 2016/0216245 | A1 | 7/2016 | Sutton |
| 2016/0232621 | A1 | 8/2016 | Ethington et al. |
| 2016/0260021 | A1 | 9/2016 | Marek |
| 2016/0290918 | A1 | 10/2016 | Xu et al. |
| 2016/0302351 | A1 | 10/2016 | Schildroth et al. |
| 2016/0309646 | A1 | 10/2016 | Starr et al. |
| 2016/0350855 | A1 | 12/2016 | Lerner |
| 2017/0083747 | A1 | 3/2017 | Guan et al. |
| 2017/0089761 | A1 | 3/2017 | McQuilkin et al. |
| 2017/0090068 | A1 | 3/2017 | Xiang et al. |
| 2017/0105375 | A1 | 4/2017 | Xu et al. |
| 2017/0109395 | A1 | 4/2017 | Farah |
| 2017/0112043 | A1 | 4/2017 | Nair et al. |
| 2017/0124463 | A1 | 5/2017 | Chen et al. |
| 2017/0161627 | A1 | 6/2017 | Xu et al. |
| 2017/0168157 | A1 | 6/2017 | Hagerman et al. |
| 2017/0169523 | A1 | 6/2017 | Xu et al. |
| 2017/0177938 | A1 | 6/2017 | Papanikolopoulos et al. |
| 2017/0186121 | A1 * | 6/2017 | Wen ..................... G06T 11/206 |
| 2017/0196171 | A1 | 7/2017 | Xu et al. |
| 2017/0199528 | A1 | 7/2017 | Detweiler et al. |
| 2017/0206415 | A1 | 7/2017 | Redden |
| 2017/0213141 | A1 | 7/2017 | Xu et al. |
| 2017/0228475 | A1 | 8/2017 | Aldor-Noiman et al. |
| 2017/0231213 | A1 | 8/2017 | Gordon et al. |
| 2017/0258005 | A1 | 9/2017 | Cutter |
| 2017/0270446 | A1 | 9/2017 | Starr et al. |

(56) References Cited

U.S. PATENT DOCUMENTS

| | | |
|---|---|---|
| 2017/0286574 A1 | 10/2017 | Chappell |
| 2018/0020622 A1 | 1/2018 | Richt |
| 2018/0060771 A1 | 3/2018 | Mangin |
| 2018/0070527 A1 | 3/2018 | Richt |
| 2018/0075545 A1 | 3/2018 | Richt |
| 2018/0075546 A1 | 3/2018 | Richt |
| 2018/0181893 A1 | 6/2018 | Basso |
| 2018/0189954 A1 | 7/2018 | Albrecht et al. |
| 2018/0211156 A1 | 7/2018 | Guan et al. |
| 2018/0322426 A1 | 11/2018 | Schmaltz et al. |
| 2018/0342020 A1 | 11/2018 | Sen et al. |
| 2018/0349520 A1 | 12/2018 | Bhalla et al. |
| 2018/0373932 A1 | 12/2018 | Albrecht et al. |
| 2019/0050741 A1 | 2/2019 | Mewes et al. |
| 2019/0050948 A1 | 2/2019 | Perry et al. |
| 2019/0075727 A1 | 3/2019 | Duke et al. |
| 2019/0147094 A1 | 5/2019 | Zhan et al. |
| 2019/0156255 A1 | 5/2019 | Carroll et al. |
| 2019/0180234 A1* | 6/2019 | Healy ............. G06Q 10/08345 |
| 2019/0228224 A1 | 7/2019 | Guo et al. |
| 2019/0325492 A1 | 10/2019 | Perry et al. |
| 2019/0333163 A1* | 10/2019 | Perry ................ G06Q 30/0283 |
| 2019/0347836 A1 | 11/2019 | Sangireddy et al. |
| 2020/0068797 A1 | 3/2020 | Folle et al. |
| 2020/0125929 A1 | 4/2020 | Guo et al. |
| 2020/0128769 A1 | 4/2020 | Gillberg et al. |
| 2020/0196535 A1 | 6/2020 | Dagondon et al. |
| 2020/0226150 A1 | 7/2020 | Shirani-Mehr et al. |
| 2020/0311828 A1 | 10/2020 | Schäfer |
| 2021/0081890 A1* | 3/2021 | Atwood ............. G06Q 10/0833 |
| 2022/0207608 A1 | 6/2022 | Raguse et al. |

FOREIGN PATENT DOCUMENTS

| | | |
|---|---|---|
| EP | 3786860 A1 | 3/2021 |
| JP | H11-232354 A | 8/1999 |
| JP | 2017-169511 A | 9/2017 |
| WO | WO 2001/046774 A2 | 6/2001 |
| WO | WO 2001/057752 A1 | 8/2001 |
| WO | WO 2001/075706 A1 | 10/2001 |
| WO | WO 2013/148290 A1 | 10/2013 |
| WO | WO 2016/090212 A1 | 6/2016 |
| WO | WO 2021/222795 A1 | 11/2021 |
| WO | WO-2023/034118 A1 | 3/2023 |

OTHER PUBLICATIONS

Extending metric index structures for efficient range query processing. Kailing, Karin; Kriegel, Hans-Peter; Pfeifle, Martin; Schönauer, Stefan. Knowledge and Information Systems10.2: 211-227. Springer Nature B.V. (Aug. 2006).*

Bast et al., "Route planning in transportation networks" arXiv: 65 pages (2015).

Dolatshah et al., "Ball*-tree: E cient spatial indexing for constrained nearest-neighbor search in metric spaces" arXiv: 15 pages (2015).

International Search Report and Written Opinion for International Application No. PCT/US2022/041518 dated Dec. 19, 2022.

Adam, B.D. et al., "Storage Hedging: What's a Merchandiser to Do ?. " Proceedings of the NCR-134 Conference on Applied Commodity Price Analysis, Forecasting, and Market Management, 1993, pp. 87-94.

Baldwin, E.D., "Understanding and Using Basis—Grains," Risk and Resilience in Agriculture, Dec. 1986, pp. 1-10.

Blank. S.C., "Research on futures markets: Issues, approaches, and empirical findings," Western Journal of Agricultural Economics, 1989, vol. 14, No. 1, pp. 126-139.

Bolton, D.K et al., "Forecasting crop yield using remotely sensed vegetation indices and crop phenology metrics," Agricultural and Forest Meteorology, vol. 173, May 2013, pp. 74-84.

Chabala, L. M. et al., "Application of Ordinary Kringing in Mapping Soil Organic Carbon in Zambia," Pedosphere 27(2), Apr. 2017, pp. 338-343.

Chicago Board of Trade, Why Trade Ag Products on Project A, 1994, pp. 1-5.

Commodity Trading Manual, published by Chicago Board of Trade, copyright 1998, 170 pages.

Crawford, P., "The New High-Tech Investing: Computer as Fund Manager," The International Herald Tribune, Feb. 1, 1992, 4 pages.

Daniels Trading, "Daniels Ag Advisory Glossary," Sep. 2004, pp. 1-2.

Diepeveen, D. et al., "Identifying key crop performance traits using data mining," World Conference on Agricultural Information and IT, Aug. 2008, pp. 1-6.

Dowell, F.E. et al., "Predicting Wheat Quality Characteristics and Functionality Using Near-Infrared Spectroscopy," Cereal Chemistry, vol. 83, Iss. 5, Sep. 2006, pp. 529-536.

Einstein-Curtis, A., "Online grain marketplace launches grain testing service," Feednavigator.com, Oct. 20, 2017, two pages, [Online] [Retrieved on Jun. 1, 2020] Retrieved from the Internet <URL: https://www.feednavigator.com/Article/2017/10/20/Online-grain-marketplace-launches-grain-testing-service>.

Ethridge, D.E., "A Computerized Remote-Access Commodity Market: Telcot," Southern Journal of Agricultural and Applied Economics, Dec. 1978, vol. 10, No. 2, pp. 177-182.

European Patent Office, Extended European Search Report, EP Patent Application No. 20836088.3, Jun. 14, 2023, ten pages.

Fields, G., "Here is How Trading Stocks by Computer Works," Miami Herald, Oct. 25, 1987, pp. 1-2.

Food Market Exchange, "FoodMarketExchange.com," Jun. 20, 2000, pp. 1-7, [Online] [Retrieved from the Internet Archive] <URL: http://web.archive.org/web/*/http://www.foodmarketexchange.com>.

Gan, Y. et al., "Improving Farming Practices Reduces the Carbon Footprint of Spring Wheat Production," Nature Communications, vol. 5, Article No. 5012, Nov. 18, 2014, pp. 1-13.

Hayenga, M.L. et al., "Formula pricing in five commodity marketing systems," American Journal of Agricultural Economics, Nov. 1980, vol. 62, No. 4, pp. 753-759.

Kastens, T.L. et al., "Post-harvest grain storing and hedging with efficient futures," Journal of Agricultural and Resource Economics, 1999, pp. 482-505.

Lemos, M. F., "Using GIS to Predict Corn Yields in Colombia," University of Redlands Thesis, May 2008, pp. 1-83, [Online] [Retrieved on Apr. 6, 2020] Retrieved from the Internet <URL: https://inspire.redlands.edu/gis_gradproj/177>.

Los Angeles Times, "Ins and Outs of Program Trading, and Why It's Being Blamed for Market Collapse," Dec. 6, 1987, pp. 1-5.

Meymandpour, R. et al. "The Economic Impacts of Electronic Marketplaces in Globalization Age: Examples from Agricultural Web Portals." 2009 2nd IEEE International Conference on Computer Science and Information Technology, Aug. 8-11, 2009, pp. 109-113.

Moschini, G. et al., "Constant or Time Varying Hedge Ratios", Proceedings of the NCR-134 Conference on Applied Commodity Price Analysis, Forecasting and Market Risk Management, 1993, pp. 1-17.

New York Mercantile Exchange, "A Guide to Energy Hedging," 1999, 1-66.

New York Times, "Gambling in Futures," Jan. 9, 1910, 1 page.

Norvell, J.M et al., "Simultaneously Derived Optimal Hedge Ratios for East Central Illinois Corn and Soybean Producers", Proceedings of the NCR-134 Conference on Applied Commodity Price Analysis Forecasting and Market Risk, Chicago, Ill., 1992, pp. 1-16.

Patterson, M.D. et al., "Hedge Ratio Estimation and Soybean Storage" Proceedings of the NCR-134 Conference on Applied Commodity Price Analysis and Market Risk, Chicago, Ill, 1994, pp. 1-15.

PCT International Search Report and Written Opinion, PCT Application No. PCT/US2021/030243, Sep. 24, 2021, 22 pages.

PCT International Search Report and Written Opinion, PCT Application No. PCT/US2021/064200, Jun. 14, 2022, 20 pages.

PCT Invitation to Pay Additional Fees, PCT Application No. PCT/US2021/030243, Jul. 13, 2021, two pages.

Piggott, N.E., "North Carolina Soybean and Corn Prices with Basis 1980-2003," North Carolina State University, Jul. 2003, pp. 1-26.

(56) References Cited

OTHER PUBLICATIONS

Purcell, W.D. et al., "Agricultural Futures and Options: Principles and Strategies" Second Edition, 1999, pp. 1-5, 7-22, 24-29, 31-54, 362-381.

Roper, W.R. et al., "Comparing Four Methods of Measuring Soil Organic Matter in North Carolina Soils," Soil Science Society of America Journal, vol. 83, Mar. 28, 2019, pp. 466-474.

Strobl, M. et al., "An Examination of the Spatial and Intertemporal Aspects of Basis Determination," NCR-134 Conference on Applied Price Analysis, 1992, pp. 1-14.

Telcot, "User's Manual for Buyers," published by Plains Cotton Cooperative Association, 1985, pp. 1-172.

United States Department of Agriculture, Agricultural Marketing Service, "Electronic Trading of Agricultural Products", paper delivered Jul. 8, 1980 to Commonwealth Club, San Francisco, Jan. 1981, pp. 1-21.

U.S. Appl. No. 60/241,543, filed Oct. 18, 2000, Inventor Reding, G. et al.

U.S. Appl. No. 62/653,480, filed Apr. 5, 2018, Inventor Dagondon, S.D. et al.

USA Futures, "usafutures.com," Jan. 25, 1999, pp. 1-12, [Online] [Retrieved from the Internet Archive] <URL: http://web.archive.org/web/19990218043052/www.usafutures.com/futuresdirectory.htm>.

Wang, A.X. et al., "Deep Transfer Learning for Crop Yield Prediction with Remote Sensing Data," Proceedings of the 1st ACM SIGCAS Conference on Computing and Sustainable Societies, vol. 50, Jun. 2018, pp. 1-5.

Wang, Z.J. et al., "Prediction of grain protein content in winter wheat (*Triticum aestivum* L.) using plant pigment ratio (PPR)," Field Crops Research, vol. 90, Dec. 2004, pp. 311-321.

Webster's New Collegiate Dictionary, 1990, p. 265.

Wisner, R. et al., "Grain Price Hedging Basics", Iowa State University, Oct. 1995, pp. 1-3.

World Book Corp, "The World Book Encyclopedia," 1994, pp. 873-874.

Zanini, F.C. et al., "Did Producer Hedging Opportunities in the Live Hog Market Decline," The Proceedings of the NCR-134 Conference on Applied Commodity Price Analysis Forecasting and Market Risk, Chicago, Ill. 1997, 17 pages.

Zhang, D. et al., "Forecasting Agricultural Commodity Proces Using Model Selection Framework with Time Series Features and Forecast Horizons," IEEE Access, vol. 8, Jan. 2000, pp. 28197-28209.

\* cited by examiner

SYSTEMS FOR MANAGEMENT OF LOCATION-AWARE MARKET DATA

CROSS-REFERENCE TO RELATED APPLICATIONS

This application is a continuation of International Application No. PCT/US2022/041518, filed Aug. 25, 2022, which claims the benefit of U.S. Provisional Application No. 63/238,539, filed Aug. 30, 2021, both of which are hereby incorporated by reference in their entirety.

BACKGROUND

The present disclosure relates to efficient management of location-based data, and in particular to the visualization and analysis of location-aware market data in a manner that minimizes memory and processor requirements.

BRIEF SUMMARY

According to embodiments of the present disclosure, methods of and computer program products for generating a visualization of location-dependent values is provided. In various embodiments, the method of generating a visualization of location-dependent values is provided where a plurality of bids and a plurality of supply locations are received from at least one datastore. Each of the plurality of bids has an associated location. A first geographic location is selected from the plurality of supply locations. A ball tree is generated, the ball tree comprising a plurality of nodes, each node of the ball tree comprising a pivot geographic location and a radius, each node corresponding to at least one local value having a location within the radius of the pivot. The ball tree is traversed to generate sorted collection of location dependent values. Each of the location dependent values is determined from one of the plurality of bids. A map of the collection of location dependent values is output.

In various embodiments, a computer program product for sorting location-dependent values is provided including a computer readable storage medium having program instructions embodied therewith. The program instructions are executable by a processor to cause the processor to perform a method where a plurality of bids and a plurality of supply locations are received from at least one datastore. Each of the plurality of bids has an associated location. A first geographic location is selected from the plurality of supply locations. A ball tree is generated, the ball tree comprising a plurality of nodes, each node of the ball tree comprising a pivot geographic location and a radius, each node corresponding to at least one local value having a location within the radius of the pivot. The ball tree is traversed to generate sorted collection of location dependent values. Each of the location dependent values is determined from one of the plurality of bids. A map of the collection of location dependent values is output.

In various embodiments, a system includes a first datastore having stored therein a plurality of bids where each of the plurality of bids have an associated location. The system further includes a second datastore having stored therein a plurality of supply locations. The system further includes a first computing node configured to perform a method where the plurality of bids are read from the first datastore and the plurality of supply locations are read from the second datastore. Each of the plurality of bids have an associated location. A first geographic location is selected from the plurality of supply locations. A ball tree is generated, the ball tree comprising a plurality of nodes, each node of the ball tree comprising a pivot geographic location and a radius, each node corresponding to at least one local value having a location within the radius of the pivot. The ball tree is traversed to generate sorted collection of location dependent values. Each of the location dependent values is determined from one of the plurality of bids. A map of the collection of location dependent values is output.

DETAILED DESCRIPTION

Growers and buyers rely on a variety of third party transportation providers to convey crops. Generally, a transportation provider is contracted for a particular job at a particular rate. The routes employed have a significant impact on growers, buyers, and transportation providers. For transportation providers, it is preferable to select routes that result in high utilization of their equipment and drivers, for example by ensuring that there is a profitable backhaul (and thus avoiding deadheading). Whether or not a backhaul is available for a given route affects the pricing of a transport contract, which in turn affects the price of a crop net of transport to a given destination. Accordingly, there is a need to provide systems and methods for management of location-aware market data.

Figure 1A:
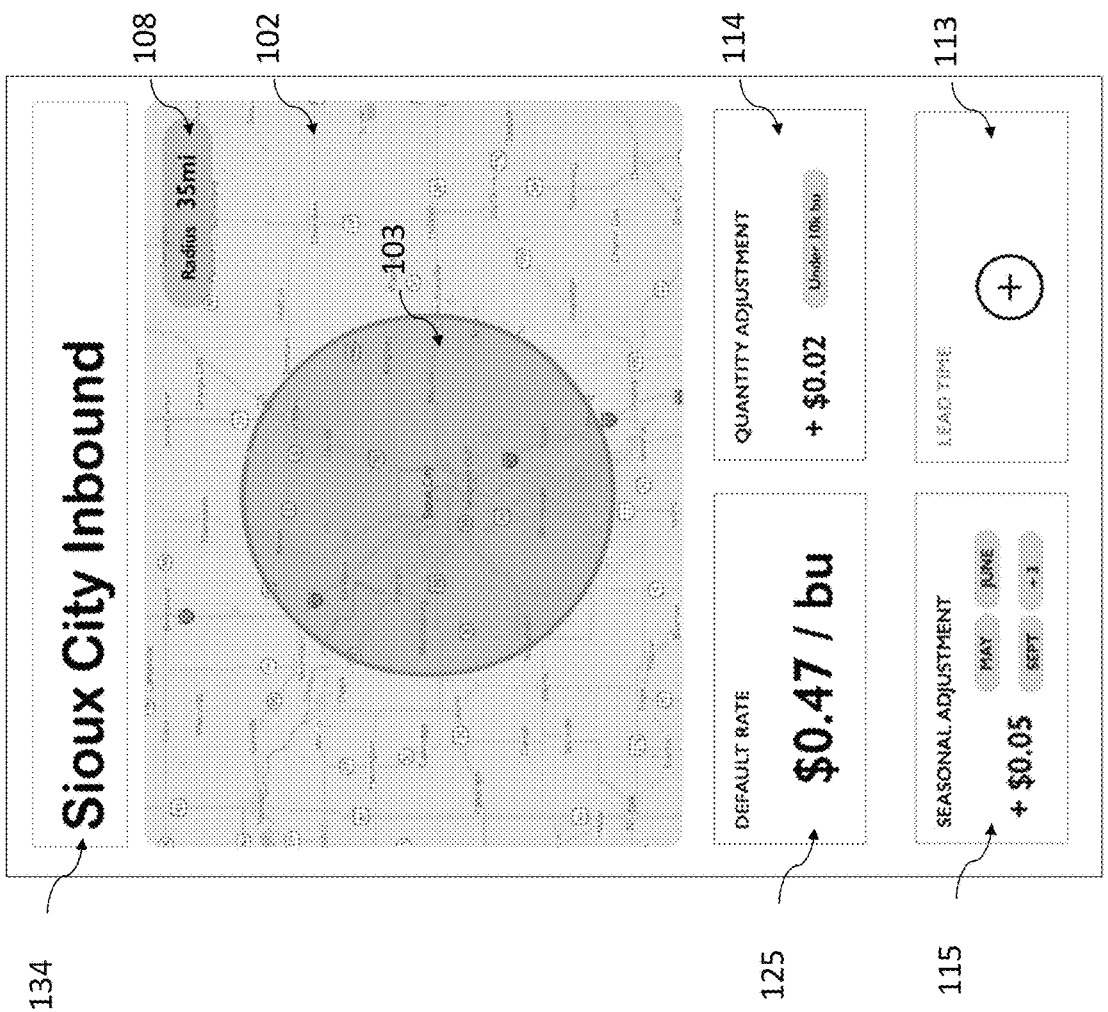
FIGS. 1A-1B illustrate exemplary rate cards according to embodiments of the present disclosure.

In an exemplary system for matching transportation providers to growers and buyers, a transportation provider identifies territories (or regions) for which they will provide inbound or outbound transportation services. An origin zone (or outbound zones) represents the geographic area within which the transportation provider agrees to start a route for freight transportation or pick-up product for transportation. A destination zone (or inbound zones) represents the geographic area within which the transportation provider agrees to deliver a product or end a route for freight transportation. A group of zones may be referred to collectively as a lane. A lane represents a region containing at least one origin location or zone and a least one destination location or zone. Each region or lane may have an associated rate for transportation services FIG. 1A shows an exemplary rate card including information that a transportation provider might identify in connection with a given inbound zone. It will be appreciated that a variety of additional methods may be used for a transportation provider to provide cost information. A rate card comprises at least one region and a rate, and has an associated effective period. Various geometries may be used to define the region, including a radius around a reference point, a polygon, or another regional definition known in the art. A rate may be given in any of a number of currencies, and may include additional metadata indicating the currency or other terms applied to the rate. The effective period may be given by a start date and end date within the rate card, just a start date, or just an end date. The effective period may also be implicit, in which case a rate card may be flagged as active when in effect and inactive when not in effect.

In this example a user has defined a rate name in the rate name field 134. The user has defined a region 103 within a user defined territory 102. The user defined region 103 is defined by a circular area having a radius of a number of miles set in a user determined radius field 108. In this example the circular user defined region 103 is centered around the geographic location, Sioux City. The user interface additionally displays a user editable field containing the default rate 125 shown in dollars per bushel of commodity transported. Default rates may be quoted per unit or quantity of goods transported (for example, dollars per crate, cents per bushel or dollars per ton) or a price per mile of transportation (for example, cents per mile of transportation of cargo, or cents per mile with an empty truck). In some embodiments, a default rate may be a flat fee. The user interface contains a seasonal adjustment 115 to the default rate, in this example the seasonal adjustment is an additional premium of $0.05 per bushel relative to the default rate for transportation in the months of May, June, September and three other months not visible. The user interface also contains a quantity adjustment 114, in this example the quantity adjustment is a premium of $0.02 per bushel for jobs involving transportation of fewer than 10,000 bushels. The user interface also contains a user editable field for a lead time adjustment 113. A lead time adjustment, like any adjustment may be a positive or negative value. In some embodiments, adjustments may be a monetary value per mile, a monetary value per unit or volume of good transported, a flat fee per trip, or a combination thereof.

Figure 1B:
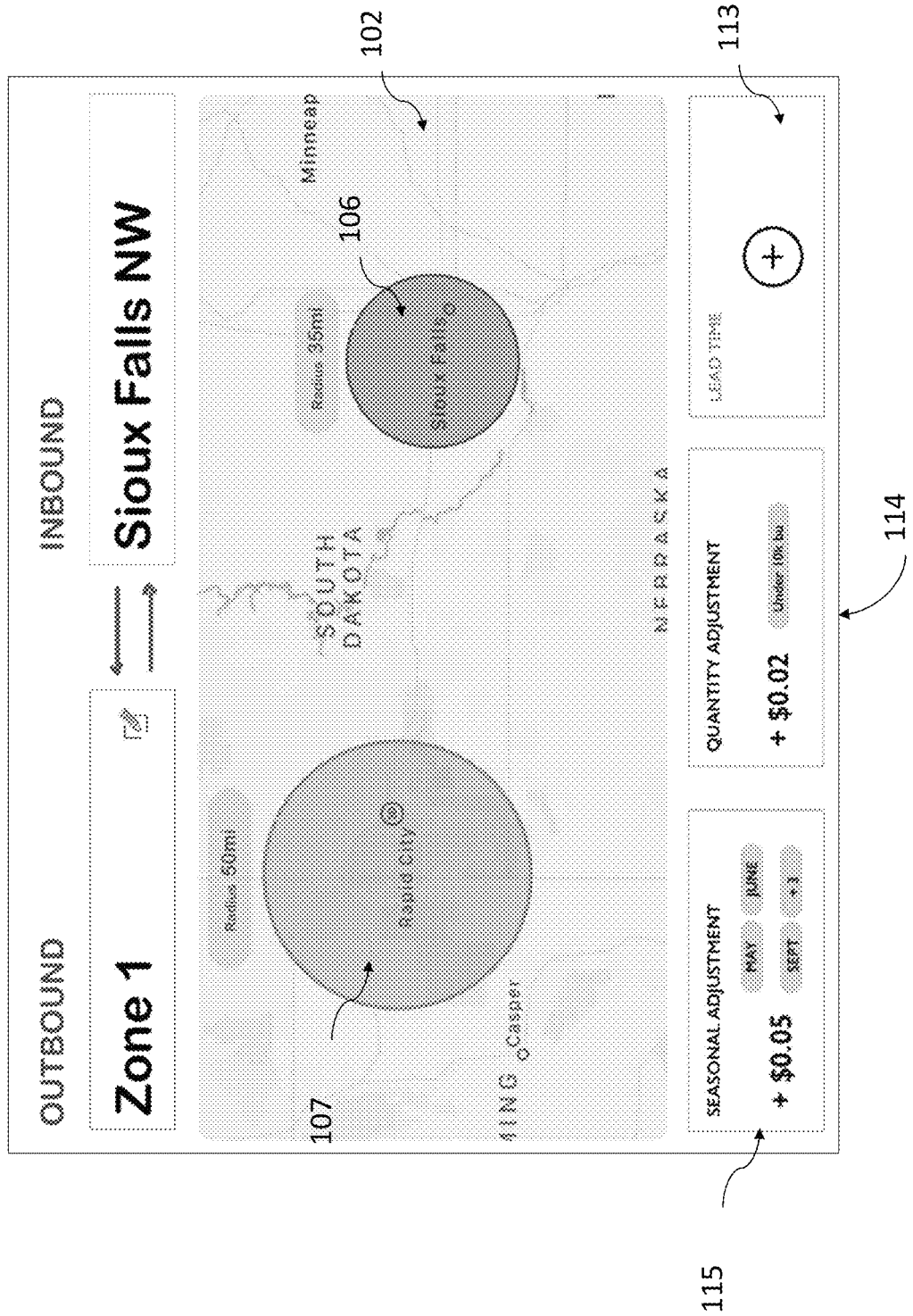

FIG. 1B shows an exemplary rate card for transportation service within a lane comprising an origin zone 107 and destination zone 106. In this example, only a portion of the user defined territory 102 is shown, and it is displayed in a contrasting color (grey) to the origin zone 107 and the destination zone 106. This exemplary rate card does not display the default rate but does display seasonal 115 and quantity 114 adjustments and a user editable field for entry of a lead time adjustment 113.

It will be appreciated that based on the contents of one or more rate cards, crop prices net of transportation costs can be computed. Alternatively, if no rate card is available for the lane to quote, one could use predictive models based historical data to estimate the freight rate. In some embodiments, transportation costs for a region may be computed based on the lowest cost custom rate of any transportation provider offering services within a geographic region where the crop product is located or where purchaser of a crop product would like the product delivered.

Figure 2:
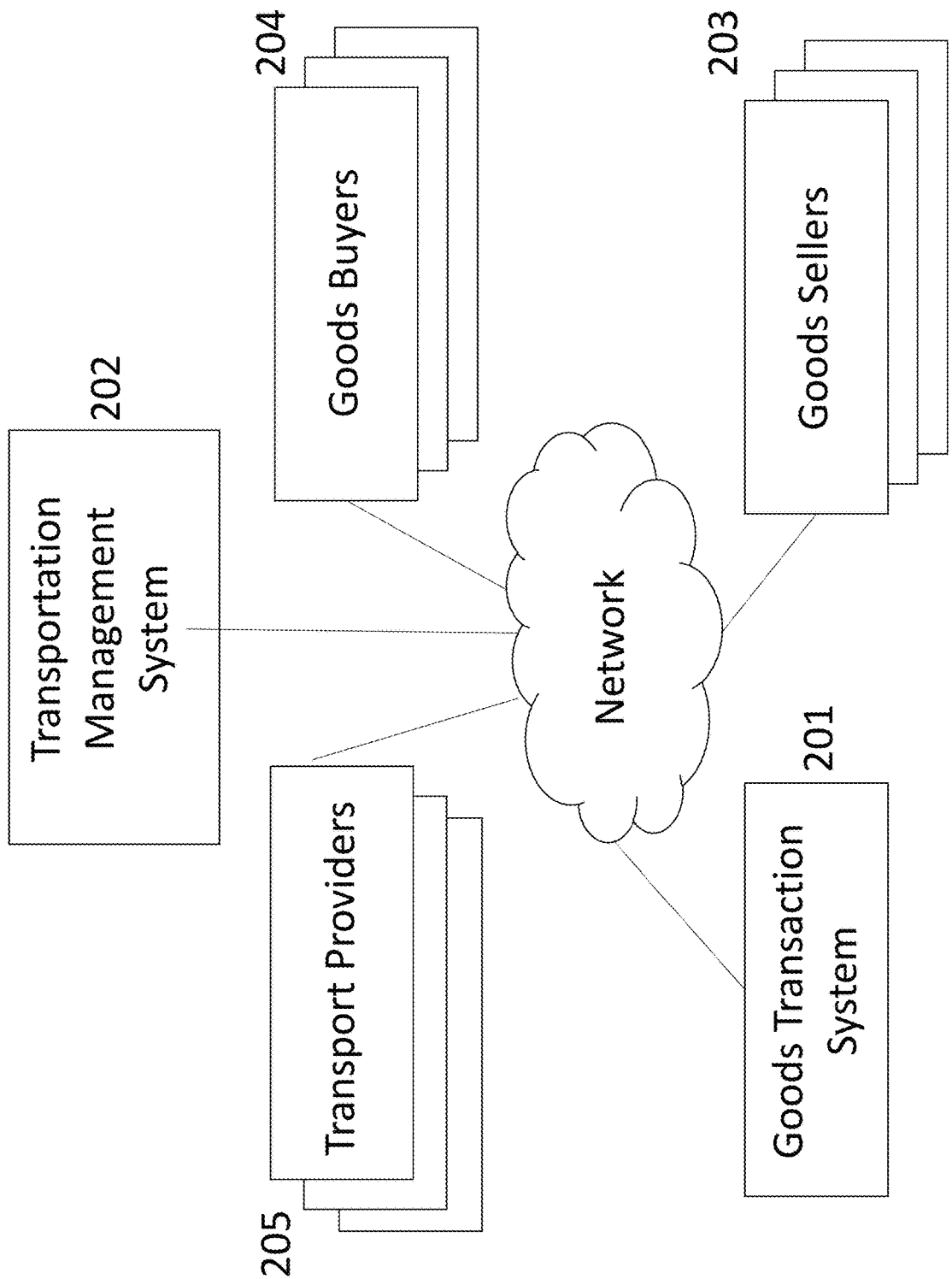
FIG. 2 is a block diagram of a system environment for a goods transaction system and a transportation management system according to embodiments of the present disclosure.

FIG. 2 is a block diagram of a system environment for an exemplary goods transaction system 201 and a transportation management system 202. The system environment comprises one or more good sellers (for example growers of commodity crops or agricultural goods) 203, one or more buyers of goods 204, and one or more transportation providers 205.

In an embodiment, the goods transaction system 201 and the transportation management system 202 include an integrated web or mobile application and a back-end computing infrastructure (such as one or more web servers). In another embodiment, the goods transaction system 201 includes a first web or mobile application and the transportation management system 202 includes a second web or mobile application distinct from the first web or mobile application. In alternative configurations, different and/or additional components may be included in the system environment. For example, the system environment may include additional or fewer growers, buyers, external data sources, and/or transportation entities. Likewise, in some embodiments, the goods transaction system 201 and the transportation management system 202 are unrelated and/or are managed by different entities. In various embodiments, the system environment include more than one goods transaction system 201. In some embodiments, a goods transaction system is a crop transaction system.

Figure 3:
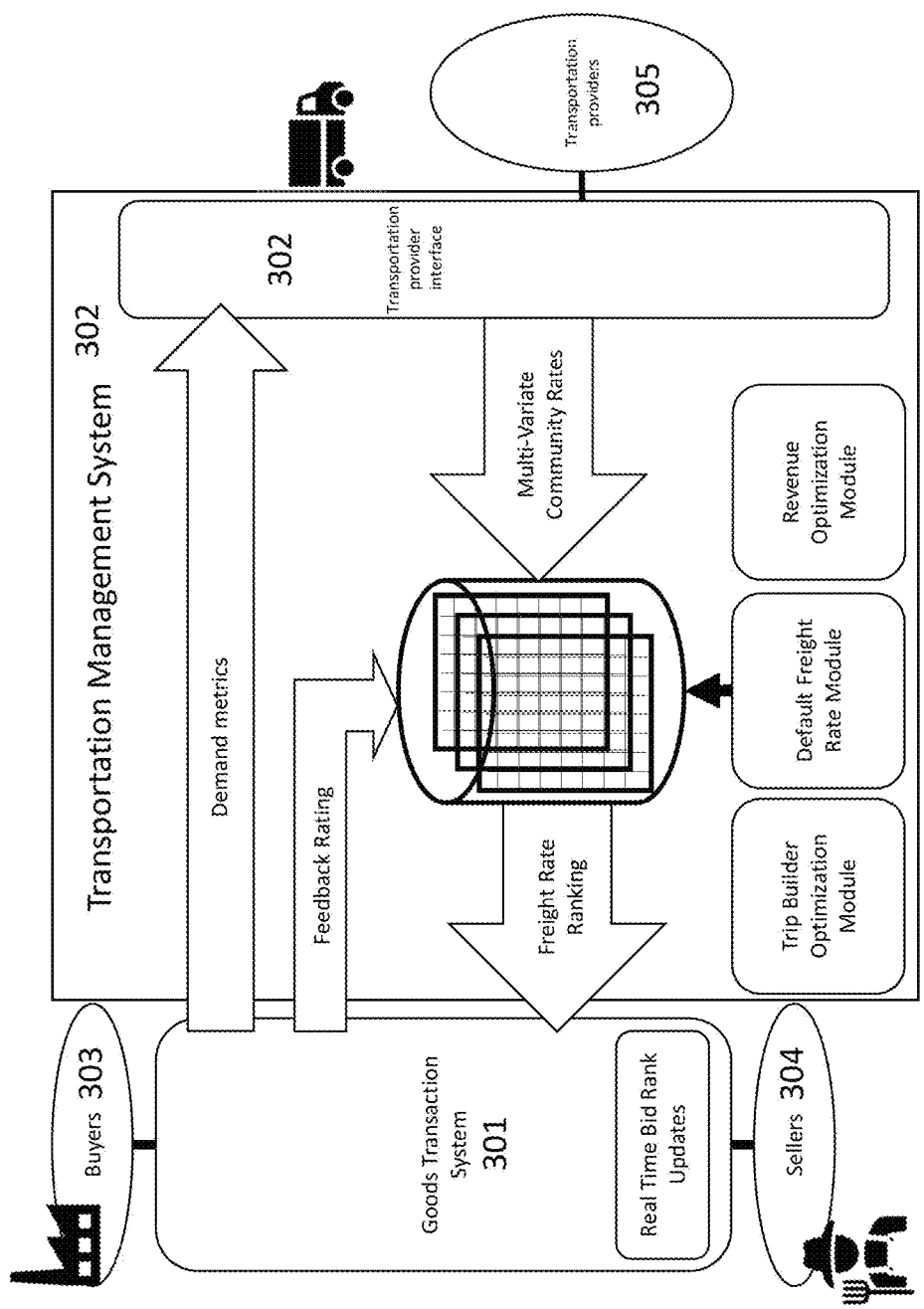
FIG. 3 shows an example of participants' interactions according to embodiments of the present disclosure.

FIG. 3 shows an example of participants' interactions between a goods transaction system 301, a transportation management system 302, buyers 303, sellers 304 and transportation providers 305.

It will be appreciated that a key value of systems set forth herein are their ability to link supply (growers) and demand (buyers). In particular, for a given grower, it is desirable to compute a best bid net of transport and to display the best bid in a readily digestible manner. For a buyer, it is desirable to determine the competitiveness of a bid net of transport in a given region. A naïve approach to generating these location-aware data is computationally inefficient, and may be intractable for sufficiently large groups of growers and buyers.

The below describes an algorithm that uses a decorated ball trees for performing an efficient retrieval of the best bid net-of-transport for a grower. This data structure is constructed using haversine distances, although other distance metrics that satisfy the triangle inequality can be used. Suitable metrics are those that are computationally cheap. Similar variations of the algorithm can be implemented for related queries (e.g., best growers for a buyer, best bids within a given radius, etc.). Other related spatial data structures, such as k-D trees, can also be used in a similar way.

Figure 4:
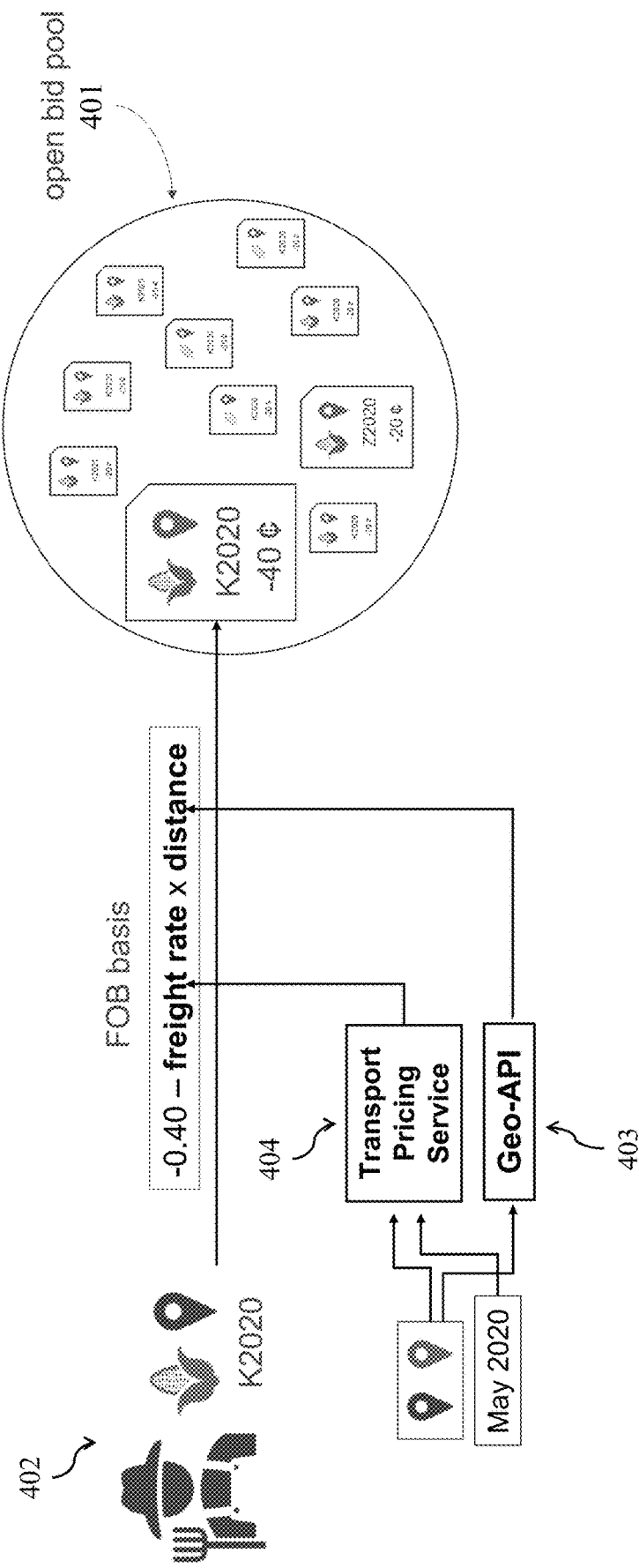
FIG. 4 illustrates an exemplary system for determining location-dependent values such as a FOB basis according to embodiments of the present disclosure.

Finding the top FOB (Free On Board, i.e., ownership changes at the time that a shipment is picked-up at the farm) bids among all open bids requires matching a grower's crop and delivery and calculating freight costs. Referring to FIG. 4, an exemplary system is illustrated. An open bid pool 401 includes a plurality of bids, each including a location and price. To determine a FOB basis, the location of the grower 402 and the location of a given bid must be determined.

Geo-API 403 is used to determine the actual road distance between the buyer and the bid. Transport Pricing Service 404 is used to determine the freight rate for the given locations and date. In various embodiments, Transport Pricing Service 404 uses rate cards as set forth above. In various embodiments, Transport Pricing Service 404 uses one or more predictive model to determine freight costs. The FOB basis may then be computed as bid price−freight rate× distance.

However, determining an optimal bid ranking of a large bid pool requires a potentially prohibitive amount of computation if an exhaustive search is performed. For example, a full-search approach would entail finding all bids that match the supply, determining a distance (e.g., via Geo-API 403) and determining freight pricing (e.g., via Transport Pricing Service 404), computing the basis net of transport, and then ranking the bids. For every bid with matching metadata (same crop, futures month, and year) the grower's net-of-transport basis is computed. It will be appreciated that such a full search approach does not scale well, particularly for real-time applications. In particular, sorting all B bids and then selecting the top N gives complexity of $O(B \log B)$. Thus, for an exemplary 1,000 grower locations and 10,000 bids, over 132 million steps would be required to determine the rankings. This complexity may be reduced by using a size-limited, double-ended queue to hold the top N bids. In this case, the algorithm would have a best-case complexity of $O(N \log N+B)$ and a worst-case complexity $O(B \log N+B)$ for each grower location.

One approach to reducing the computational load would be to limit the bids searched using a relatively cheap computation prior to performing further computation. Exemplary search limiting steps include: including only bids within a fixed haversine distance of the grower; including only the N most proximate bids, or including only bids with an approximate FOB meeting a minimum value.

However, these approaches provide only a statistical guarantee of correctness. In practice, obtaining a high confidence requires looking at bids that are a great distance away.

To address this shortcoming of alternative approaches, the present disclosure provides an efficient and correct bid ranking algorithm. The algorithm includes two major components: a custom spatial index that stores the bids in memory using a decorated ball tree; and heuristics for index exploration that prune the search for the best bids.

Figure 5:
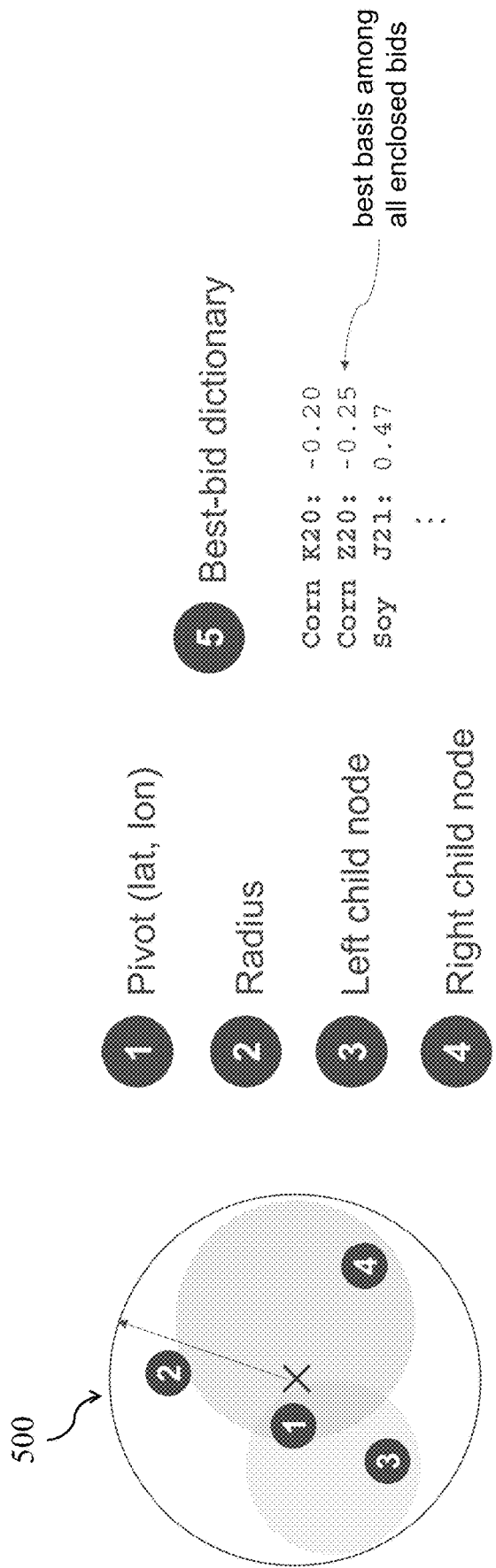
FIG. 5 is a schematic diagram of a node of a decorated ball tree according to embodiments of the present disclosure.

Referring to FIG. 5, a decorated ball tree is illustrated according to the present disclosure. The decorated ball tree is a hierarchical spatial index in the form of a binary tree, used to store the bids. Each non-leaf node 500 includes a pivot, a radius, and a best bid. In various embodiments, a best bid is included for each relevant category (e.g., crop and delivery) among all bids enclosed in child nodes. Each non-leaf node includes a left child node and a right child node. Leaf nodes include a best bid list instead of a left and right child node.

Figure 6:
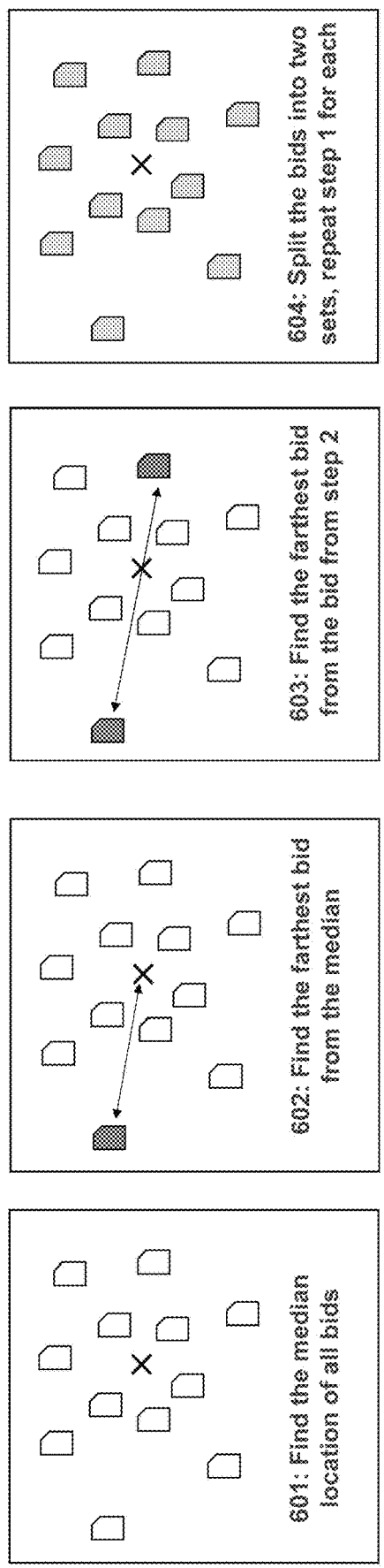
FIG. 6 illustrates steps to generate a ball tree according to embodiments of the present disclosure.

In various embodiments, a recursive bulk insertion algorithm is used to construct the tree as illustrated in FIG. 6. The objective is to construct balls that are small and have as little overlap as possible. At 601, the median location (centroid) of a set of bids is located. The current node's pivot is set to the centroid. At 602, the furthest bid ($p_1$) from the centroid is located. The node's radius is set to that maximum distance. At 603, the furthest bid ($p_2$) from the bid located in the prior step ($p_1$) is located. At 604, the set of bids is split into two subsets based on proximity to the two previously identified bids ($p_1$, $p_2$). Each of the two subsets is assigned to a child node, and the process is then repeated for each subset. If the set of bids decreases below a minimum size, then the node is a leaf node, which is populated with that set of bids. Node splitting stops when the number of bids is less than a predetermined size limit. It will be appreciated that online insertion and deletion of bids may be provided in addition to pre-construction of the tree.

The construction will generate a tree with $\log N+1$ levels (ignoring truncation driven by the node size limit), and on each level there are $4N$ distance calculations. Thus, the distance calculation function will be called $O(4N \log N+4N)$ times when constructing the tree. Increasing the node size will reduce the depth of the tree and the construction effort, but it will also increase the effort on querying the tree.

Figure 7:
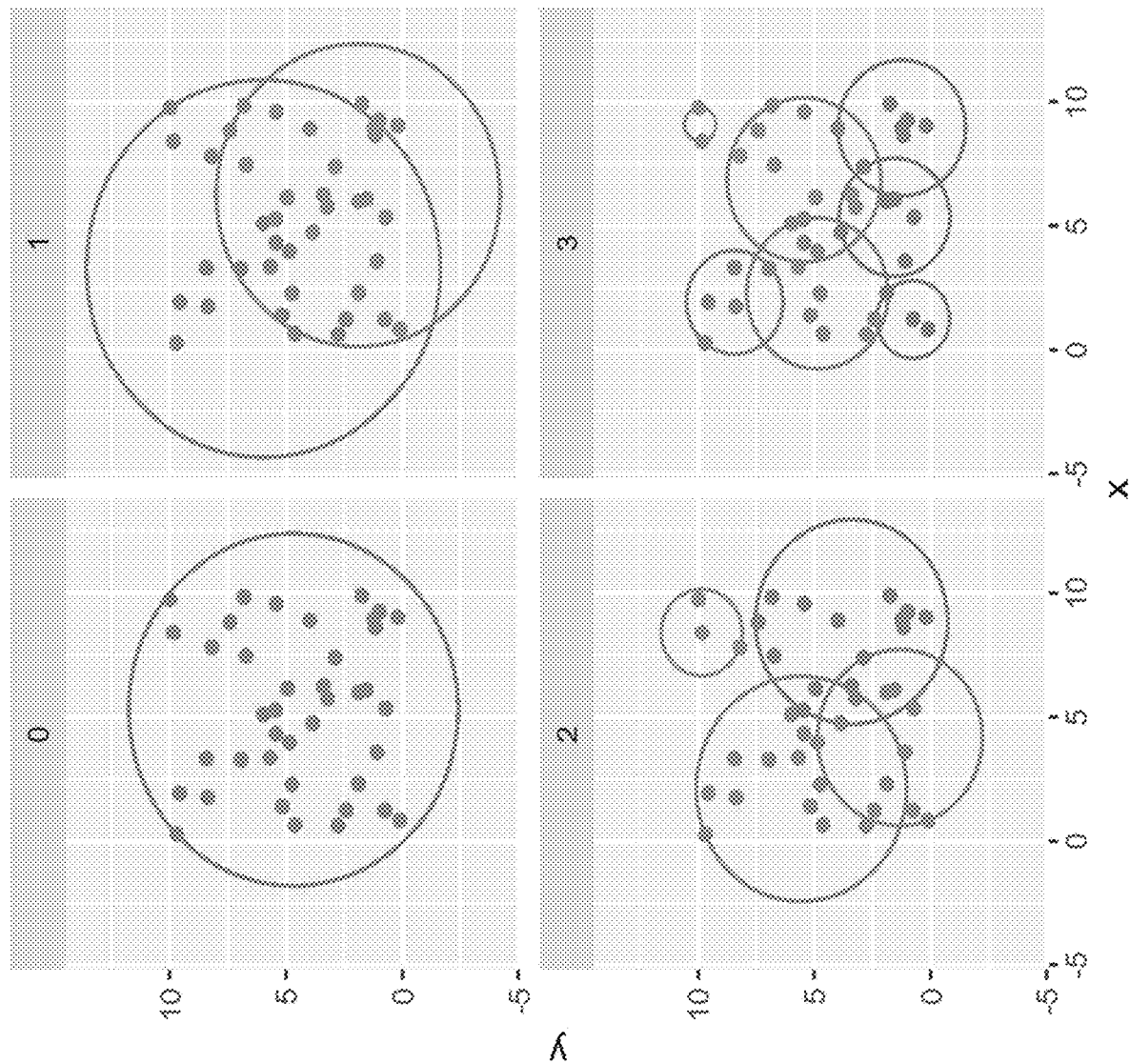
FIG. 7 illustrates the first 4 levels of an exemplary ball tree in Euclidean space according to embodiments of the present disclosure.

FIG. 7 illustrates the first 4 levels of a ball tree in Euclidean space, with 40 random points. The balls generated at each level and the points belonging to each ball are shown. Balls can overlap, but a point is associated with exactly one ball at each level.

In order to perform efficient search of the ball tree, heuristic search may be employed. The search problem may be phrased as follows: given a grower supply point g (with crop and delivery), find the top N bids by basis net of transport (FOB bids). A ball tree containing all open bids is searched. In addition, distance and freight heuristics ($dist^H$ and $rate^H$, respectively) are combined to provide a FOB heuristic ($FOB^H$) that overestimates net basis. It will be appreciated that dist and rate are expensive functions that, e.g., require calling services like geo-API to obtain the over-the-road distance and Transport Pricing Service for the freight cost, while $dist^H$ and $rate^H$ are cheap to call.

$$dist^H(g,b) \leq dist(g,b)$$

$$rate^H(g,b) \leq rate(g,b)$$

$$FOB^H(basis,g,b) = basis - dist^H(g,b) \cdot rate^H(g,b) \geq basis - dist(g,b) \cdot rate(g,b) = FOB(basis,g,b)$$

During search, a priority queue of size N is maintained, holding the bids located to date, sorted by actual FOB.

At each non-leaf node, a decision is made as to whether to traverse its children. If the queue has fewer than N items, the children are always traversed. A node cannot contain a better bid if:

$$node.best\_basis - dist^H rate(g,c) - r) \cdot rate^H(g,c) \leq FOB_N$$

where $FOB_N$ represents the best $N^{th}$ FOB value found so far (stored at the end of the priority queue).

Accordingly, the child nodes are traversed only where there is the possibility of a better bid. g corresponds to the grower supply point, c corresponds to the center of the ball, and r corresponds to the radius of the ball.

At each leaf node, all bids are evaluated and the queue is updated using exact FOB, computed from actual distance and price data rather than a heuristic. If the FOB of a bid in the leaf node's list is favorable to the a bid in the queue (has a FOB value greater than the Nth best value in the queue), or the queue has fewer than N bids, the bid is inserted to the queue. Bids can be evaluated in a batch to amortize any possible fixed overhead computational cost when calling dist( ) and/or rate( ).

In exemplary embodiments, given a test point q and one or more desired BidCategory, a current_node variable is set to point to the root of the ball tree and a size-limited, double-ended priority queue top_n is initialized to hold the best bids (sorted by net basis). The search process may then be summarized as follows:

1. If current_node is a leaf node, then loop over current_node.bids, compute their net basis, and insert into top_n any bid whose category matches the target set of categories (note that actual insertion will only occur if the current size of top_n is less than N or if the bid's net basis is greater than the top_n.last, the worst bid in the queue).
2. Otherwise, if current_node is not a leaf node, starting with the branch whose pivot is closest to q, repeat step 1 for each of the children of current_node only if the following code snippet returns true
3. def expand_child(child: Node, top_n: Queue[Bid]):
   min_dist=$dist^H$(q, child.pivot)−child.radius
   net_basis_bound=child.best_basis−freight*min_dist
   return  top_n.size(  )<top_n.max_len  or net_basis_bound>=top_n.last It is assumed in this example that freight costs are proportional to distance. This assumption can be relaxed as long as net_basis_bound remains a valid upper bound on net basis.

In order to achieve network efficiency and improve response time, it is desirable to send as few lanes (origin/destination pairs) as to the transport pricing service and Geo-API as possible. In addition, it is desirable to make as few service calls as possible in order to minimize connection setup and teardown costs.

In order to minimize the number of service calls, bids in each explored leaf node are batched to be sent to the transport pricing service and Geo-API. In addition, it is possible to increase the leaf node size in order to increase the number of grower-bid pairs per batch while minimizing the number of batches. However, this approach reduces the efficacy of the ball tree in minimizing the total number of requests. An alternative approach is to aggregate several leaf nodes before sending a request.

In various embodiments, in addition to node aggregation, a warm start optimization is provided. In an exemplary warm start search, the top N*K bids are determined using only FOB'. By using the heuristic value in place of actual FOB, faster approximate results are obtained. The actual FOB value is then computed for those N*K bids. The resulting bids are sorted, and the top Nth bid is selected as the starting point for the ball tree search. Warm starting cuts down the search significantly, especially for N≥10.

In various embodiments, different heuristic freight rates may be used. In various embodiments, lower bounds 0, 1, and 2 $/mi are adopted as heuristics. It will be appreciated that a lower bound of 0 results in a greater number of unnecessary quotes and calls, while a tighter lower bound results is significant increase in performance. It will also be appreciated that a lower bound may be predetermined for a given region according to historic or current values with a low-cost sorting of existing rates.

In an exemplary embodiment of a decorated ball tree, 45 k bids can be held in approximately 250 MB of memory. Bid tree construction takes approximately one minute. A constructed tree can be serialized and stored for reinstantiation.

In various embodiments, a ball tree is refreshed on a schedule as new bids become available.

In various embodiments, $dist^H$ is given by the haversine distance. In various embodiments, $rate^H$ is provided as a static value. In various embodiments, $rate^H$ is provided by a transportation rate service that provides a lowest rate of any active rate cards. In various embodiments, $rate^H$ is provided by a transportation rate service that provides a lowest rate for any rate card with a given origin and delivery window.

In various embodiments, the net basis is computed by sending the lanes to the transportation rate service (to perform rate card matching) in parallel with sending the lanes to a Geo-API for road-distance measuring. The net basis is then computed for each of the relevant grower/bid pairs.

As set out above, the ball tree implementation relies on a distance function and a value function to find the best bids (in this case, the value function returns a bid's net-of-transport value for a given grower and bid pair). These functions are called at different times during the construction and exploration of bids in the ball tree. It is thus helpful to distinguish between two types of calls: Heuristic Calls for Non-Leaf Nodes, used to determine if a given branch should be explored; and Batch Calls for Leaf Nodes, used to evaluate all the actual bids in a leaf node, which can be sent in a batch.

Heuristic calls need not return the exact distance or freight cost, as long as they return a lower bound on these quantities. On the other hand, batch calls do need to return the correct net basis. Thus, separate implementations for the heuristic and the batch functions may be provided to ensure an efficient exploration of the bids. Accordingly, in various embodiments, a haversine approximation and a lower bound on rate cards is used for the heuristic calls, while actual road distances and rate cards are used for the batch calls.

The advantage of this approach is that the number of batch calls needed is typically much lower than the number of heuristic calls.

The relative number of heuristic and batch calls can be controlled by adjusting the minimum number of bids per leaf in the ball tree (the ball tree leaf node size). A larger node size would give a shallower tree, where fewer batch calls are sent but each batch request will have a larger number of bids. As the ball size increases, more points are evaluated in each batch request, but fewer calls are also made to this function (an asymptote of about 25 batch function calls is reached at ball sizes of 80 or greater). The total query time increases more slowly and stayed below 30 sec for ball sizes of 80. In an exemplary case using 45,000 matching open bids, using a ball size of 80, about 25 calls to the rate function would be required, with a total of 1250 lane quotes. Assuming each service request has an overhead of 100 msec (independent of request size), plus 0.65 msec per lane, about 3.3 sec would be required to find the top 20 bids in this scenario.

As set out above, in various embodiments a transport pricing service is used to manage rate cards configured by users. This allows carriers to set their quotes ahead of time. These rate cards can then be used for directly quoting growers. It is important that this service is able to retrieve rate cards and find the most appropriate rate for a lane efficiently and at scale. Multiple services and tools, including those described above rely on these rates for the appropriate evaluation and comparison of bids, an evaluation that often requires calculating freight costs for hundreds or thousands of grower-buyer pairs in a very short amount of time.

Two categories of approaches for retrieving all relevant rate cards and finding the optimal match for a given lane(s) are provided herein. The first category relies on a spatial database (e.g., PostGIS), while the second category relies on custom data structures such as those described above in connection with efficiently retrieving bids. By residing fully in memory, these structures reduced the time to retrieve the rate cards significantly, while incorporating evolving business logic that would be otherwise hard to incorporate using a GIS database.

For the purposes of the following analysis, the approaches are compared against performance metrics under some assumptions about the expected scale of the transport pricing service. The table below states these metrics, as well as their targets and assumed scale for testing (metrics are ranked in order of descending importance).

| Metric | Description | Target | Assumed Scale |
| --- | --- | --- | --- |
| Best rate retrieval time for one origin and N destinations | Given an origin and N locations, find the best rates for each of the associated lanes | <1 sec | N = max num of active bids in a 500 mi radius 5 k unique rate cards |
| Memory footprint | Host memory needed to store any indexes or data structures for retrieval | <300 MB | 5 k unique rate cards |
| Rate card create/update/delete time | Time taken after updating a rate card and before any indexes or data structures are ready to use with the new data (note: assumed asynchronous) | <40 sec | 5 k unique rate cards |
| Minimum rate retrieval time from an origin to points within a given area | Given an origin and an area, return a lower bound on the best rate for delivering to any point within the area. This query would help speed up associated "find-best-bid" queries. | <100 msec | 5 k unique rate cards |

Rate card matching can be implemented using a spatial database query. The following pseudo-code sketches such a query, ignoring for illustration purposes some of the requirements (the carrier base rate, lead time adjustments, and capacity constraints are not incorporated in this query, but it will be appreciated that they can be added). The query can be broken down into the following steps:
1. For each carrier, find the rate card that contains the quoted lane's origin and destination point. By construction, there will be at most one rate card satisfying these assumptions.
2. Find any rate adjustments for this rate card that overlap with the lane's delivery window.
3. Select the highest adjusted rate for each carrier.

The next step is to use a carrier_rates table to find the best rate for the lane of interest. The query sorts rate cards from best to worst. In case this table is empty, a standard rate may be substituted.

A main drawback of the database approach is the potential for increased latency, particularly in cases where this service must quote a large number of lanes in a short amount of time in order to run calculations such as finding the top bids net-of-transport for a given grower. Thus, alternate approaches are provided relying on custom, in-memory data structures that holds the rate cards and allows for very fast retrieval.

For the purposes of this discussion, a RateCard contains a rate and a series of adjustments for date ranges that are contained by the rate card's date range. It is assumed that, for each carrier, there is exactly one rate card with is_base=True, and this rate card contains (spatially and temporally) all other rate cards for the carrier. Rate cards of a given carrier with is_base=False are disjoint (but do not necessarily partition the space enclosed by the carrier's base rate card).

In a first exemplary custom-index variant, sequential matching is employed. In the sequential matching approach, all the rate cards are stored in a list. When given a Lane instance to match, all the rate cards are traversed, checking if the rate card overlaps, and if it does capture the carrier's rate. The best rate among all rate cards is returned, being careful about always preferring a custom rate (if it exists) over the base rate for each carrier and giving preference to high-performance carriers (carrier.rating=1). In some embodiments, overlaps checking, which could be expensive, is only performed if the rate can improve the current best rate.

In a second exemplary custom-index variant, independent attribute indexing is employed. In this approach, the lane's origin, destination, and delivery windows are matched independently against the corresponding attributes of the rate cards. Each attribute matching returns a set of rate cards. The intersection of the sets is taken to find all rate cards that match all attributes. Finally, those rate cards are processed according to the sequential matching method described above.

The independent matching can be done efficiently using indexes. For example, determining if lane. origin is contained in the rate_card.origin can be done efficiently if all the rate card origin geometries (more specifically, their bounding boxes) are stored in an R-tree, and similarly for the other dimensions. It is assumed that RTree has a contains method that returns a list of all geometries stored in the index which contain the given point, and the concept of a geometry is generalized to also include a time interval (used for comparing time range inclusion).

Once all potentially matching rate cards are found, they are passed to the sequential matching method described above to perform an accurate overlap query (using the actual geometry) and find the best rate.

This approach can store the geometries in an R-Tree data structure. Because it is only testing inclusion against bounding boxes, these can be done very efficiently, and once the set intersection is complete, there will at most 2 matching rate cards per carrier (one base and one custom rate).

In a second exemplary custom-index variant, full indexing is employed. In this approach, a custom index is constructed that allows the search procedure to consider all attributes at once. This can be done using an approach similar to k-D Trees, where attributes are alternated as different branches of the tree are explored, and where each node of the tree splits the geometries bounding boxes.

Furthermore, if the nodes of the trees are decorated with the best possible rate for each branch, the search could be pruned even further.

The construction of this index relies on an Entry class, that maps to a rate card and that contains three Extent instances. These instances form the bounding boxes of the origin, destination, and date ranges. A binary tree is defined that is referred to as KDRTree, and that uses bulk loading for splitting the entries according to the branching dimension corresponding to each node. This dimension alternates between the 3 dimensions (origin, destination, time) based on the depth of the node.

Searching for lane inclusion in the KDRTree involves going down the nodes of the tree (starting at the root) and testing inclusion of the node's extent for the corresponding dimension against the lane's corresponding attribute. Branches where the inclusion test fails are pruned and entries are only returned from visited leaf nodes.

Figure 8:
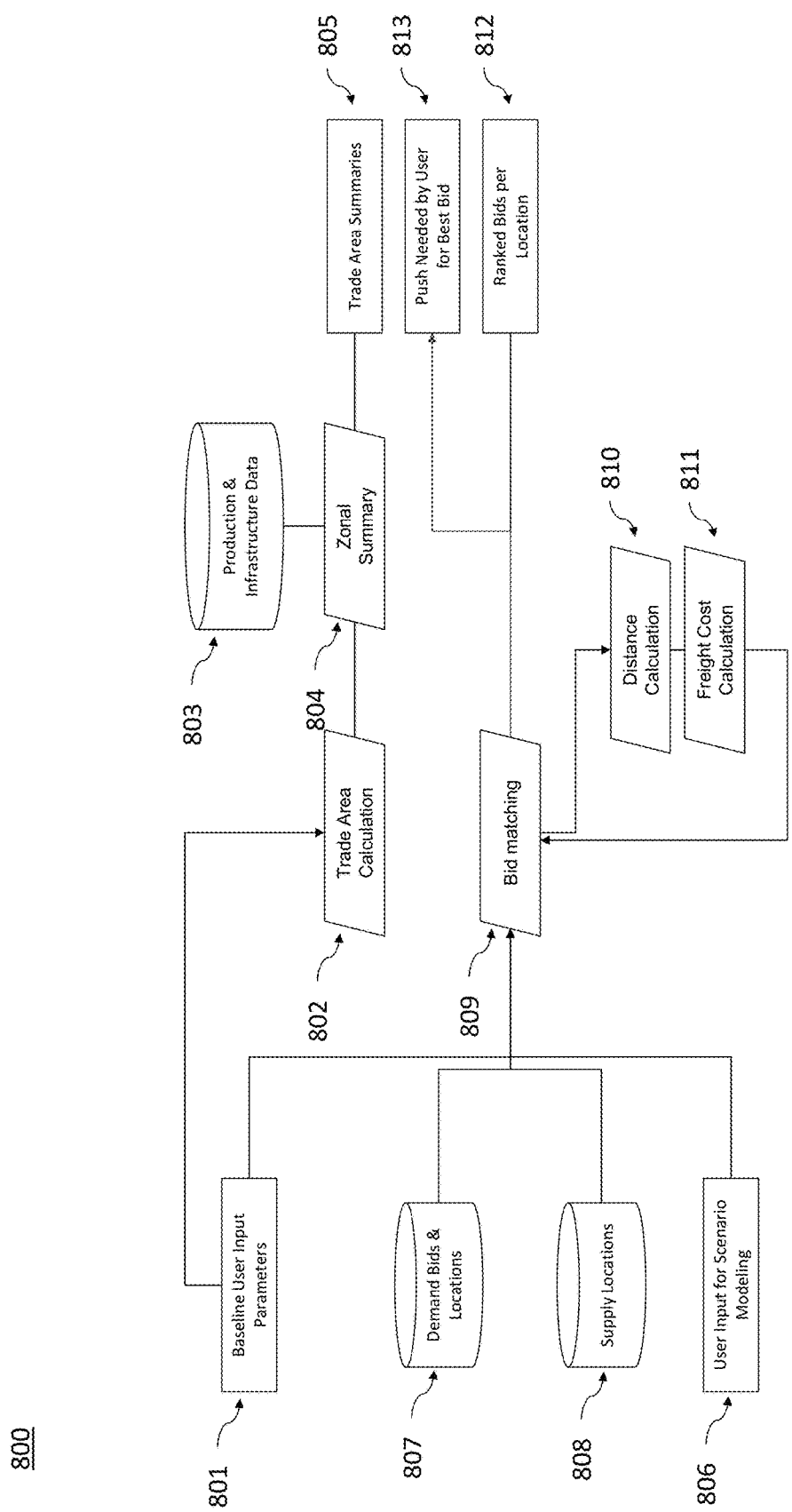
FIG. 8 is a block diagram of a system for visualizing and comparing a plurality of location-aware bids according to embodiments of the present disclosure.

Referring to FIG. 8, an exemplary system 800 for visualizing and comparing a plurality of location-aware bids is illustrated. System 800 enables a user to determine bid competitiveness. A plurality of baseline user input parameters 801 are received from a user or read from a user configuration. User input parameters 801 may include a futures month, a delivery window, a trade area definition, and/or a buyer location. User input parameters 801 are then used to determine a relevant trade area 802 for the user. Production and infrastructure data 803 provide geocoded information about a geographic region, and is combined with the trade area 802 in order to compute relevant zonal summaries 804 to the user. Trade area summaries 805 are then provided for the trade areas of interest based on zonal summaries of the production and infrastructure data.

In various embodiments, the trade area summary and the zonal summary summarizing historical crop production, forecasts for current production, grain storage capacity and competitor locations within the trade areas.

Baseline user input parameters 801 are further combined with user input for scenario modeling 806. User input may include bid adjustment information, for example. Datastore 807 includes demand bids and locations. Datastore 808 includes supply locations. Reading from these datastores, matching process 809 determines bids suitable for available supply locations, in view of relative location and net of transport costs. In particular, matching process 809 employs the ball tree algorithm described above, and includes distance calculation 810 and freight cost calculation 811, which employ the heuristic methods described above.

Based on the matching between bids and supply locations provided by bid matching 809, a ranked list of bids per location 812 is generated. In addition, one or more indications 813 may be provided to a user in order to achieve a best bid.

Figure 9:
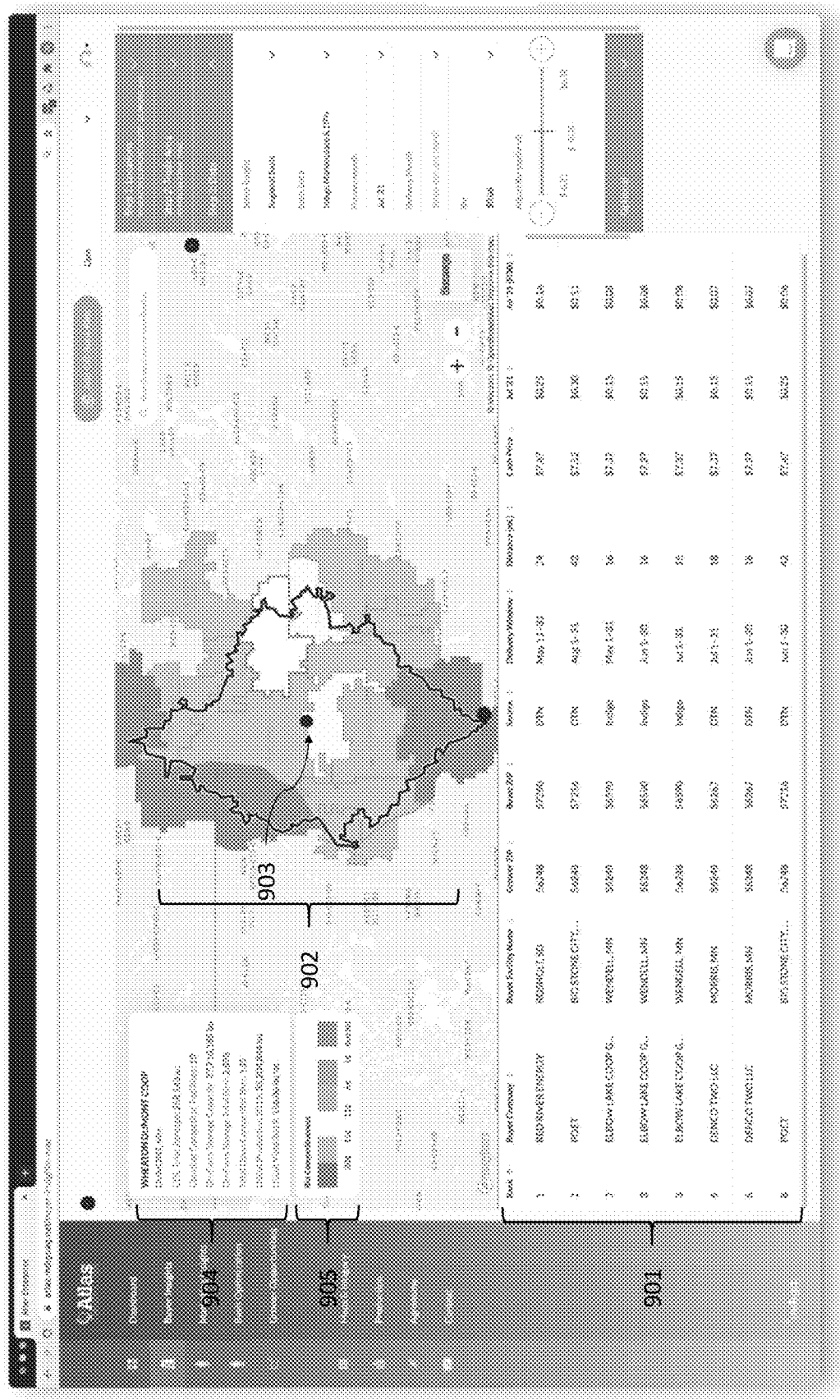
FIG. 9 illustrates a user interface for comparing a plurality of location-aware bids according to embodiments of the present disclosure.

Referring to FIG. 9, an exemplary user interface 900 for comparing a plurality of location-aware bids is provided. In various embodiments, user interface 900 is generated by system 800. An exemplary user of this interface is a buyer customer. The user interface allows them to run simulations, modifying their bids to instantaneously see the impact of their potential changes on the competitiveness of their bids (relative to other buyers) within their trade area.

In this example, a location and a trade area has been selected, and a regional basis summary is displayed. The user may adjust their bid in order to see a dynamic update of the map and bid information.

Best bid list 901 provides the best bids for a pictured region. In particular, a buyer company, buyer facility, grower ZIP, buyer ZIP, source, delivery window, distance, cash price, and FOB basis are provided. Map 902 depicts a region of interest surrounding a user selected facility located at point 903. Facility information 904 is provided, including CDL total acreage, count of competitor facilities, on-farm storage capacity, on-farm storage total bins, USDA production in prior years, and USDA yield in prior years. A heat map is overlain on the map, showing bid competitiveness on a regional basis according to key 905.

Figure 10:
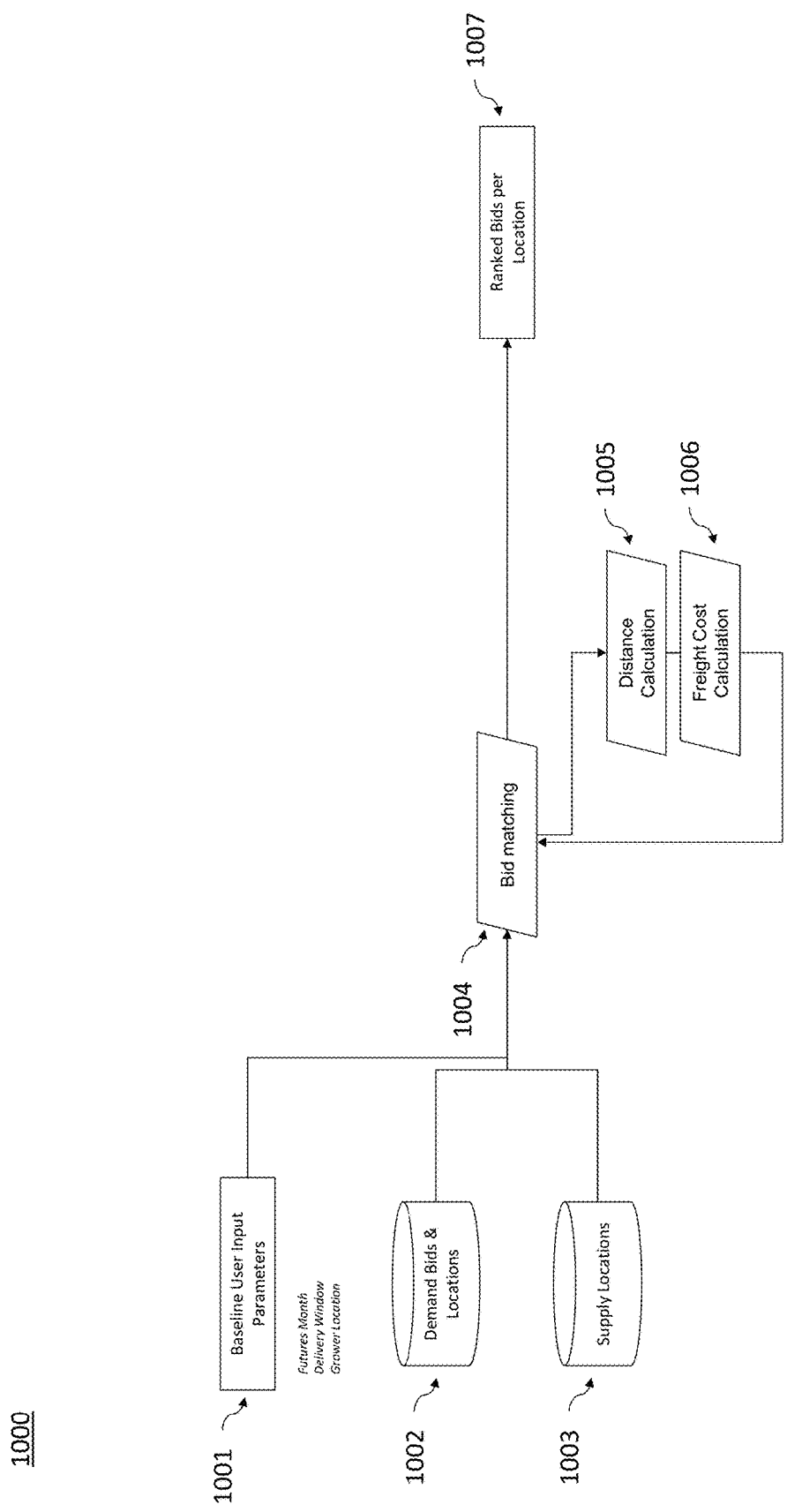
FIG. 10 is a block diagram of a system for visualizing and comparing a plurality of location-aware bids according to embodiments of the present disclosure.

Referring to FIG. 10, an exemplary system 1000 for comparing a plurality of location-aware bids is illustrated. System 1000 enables a user to determine bid competitiveness. A plurality of baseline user input parameters 1001 are received from a user or read from a user configuration. User input parameters 1001 may include a futures month, a delivery window, a trade area definition, and/or a buyer location. Datastore 1002 includes demand bids and locations. Datastore 1003 includes supply locations. Reading from these datastores, matching process 1004 determines bids suitable for available supply locations, in view of relative location and net of transport costs. In particular, matching process 1004 employs the ball tree algorithm described above, and includes distance calculation 1005 and freight cost calculation 1006, which employ the heuristic methods described above.

Based on the matching between bids and supply locations provided by bid matching 1004, a ranked list of bids per location 1007 is generated.

Figure 11:
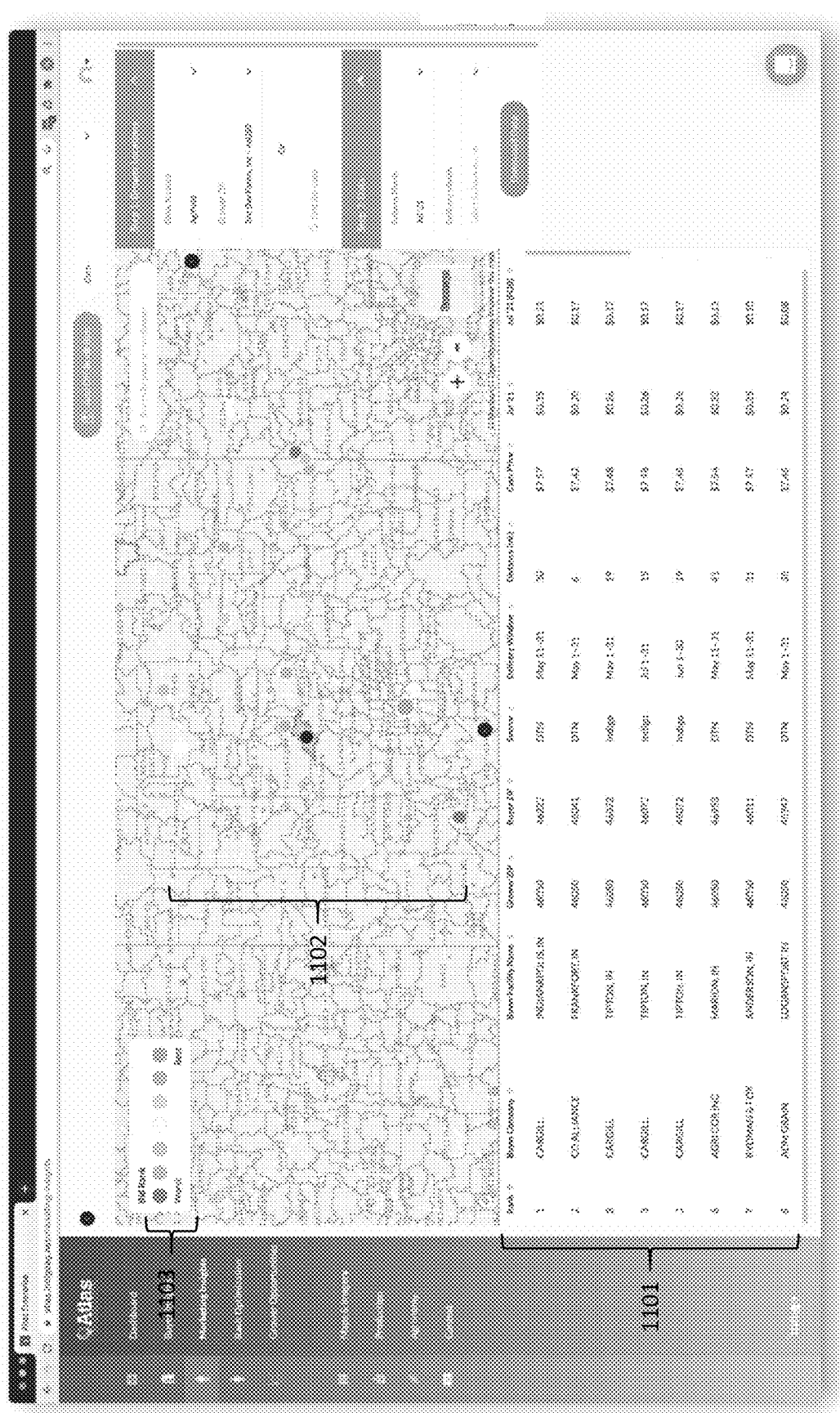
FIG. 11 illustrates a user interface for comparing a plurality of location-aware bids according to embodiments of the present disclosure.

Referring to FIG. 11, an exemplary user interface 1100 for comparing a plurality of location-aware bids if provided. In various embodiments, user interface 1100 is generated by system 1000. Exemplary users of this interface are individuals interested in marketing a crop, such as growers or their representatives of them (e.g. grain marketing advisors). The user interface allows them to instantly see the best bids for growers in a particular location, net of transportation costs. In this way, user interface 1100 delivers real time market insights.

Best bid list 1101 provides the best bids for a pictured region. In particular, a buyer company, buyer facility, grower ZIP, buyer ZIP, source, delivery window, distance, cash price, and FOB basis are provided. Map 1102 depicts a region of interest with the locations of the best bids indicated with a circle indicative of bid rank 1103.

Figure 12:
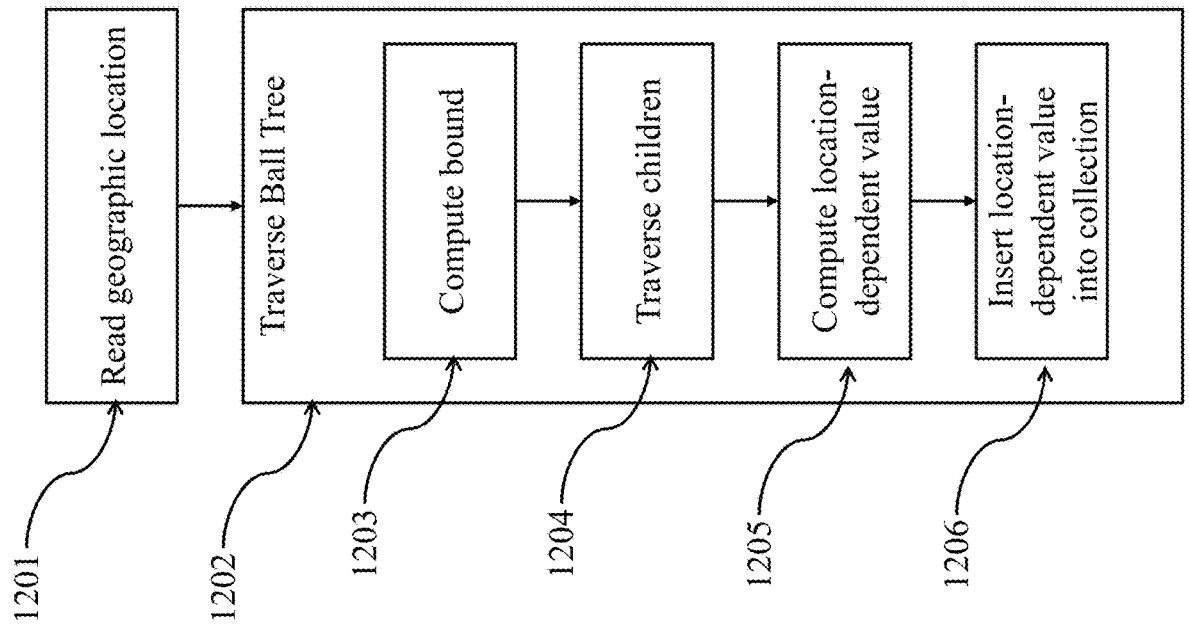
FIG. 12 illustrates a method of sorting location-dependent values according to embodiments of the present disclosure.

Referring to FIG. 12, a method of sorting location-dependent values is illustrated. At 1201, a first geographic location is read. At 1202, a ball tree is traversed. The ball tree comprises a plurality of nodes, each node of the ball tree comprising a pivot geographic location and a radius, each node corresponding to at least one local value having a location within the radius of the pivot. Traversing the ball tree comprises: at 1203, computing a bound on the location-dependent value for at least one node of the ball tree based on its corresponding at least one local value, its pivot geographic location, and the first geographic location, and at 1204, selectively traversing at least one child of the at least one node according to the bound. At 1205, the location-dependent value is computed for the at least one child based on its corresponding at least one local value, its pivot geographic location, and the first geographic location. At 1206, the location dependent value of the at least one child is inserted to a sorted collection having a predetermined size.

Figure 13:
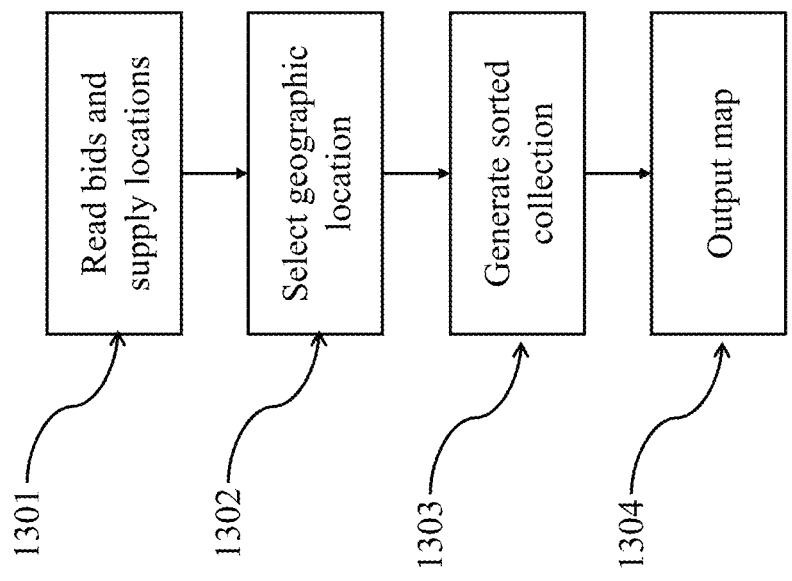
FIG. 13 illustrates a method of generating a visualization of location-dependent values according to embodiments of the present disclosure.

Referring to FIG. 13, a method of generating a visualization of location-dependent values is illustrated. At 1301, a plurality of bids and a plurality of supply locations are read from at least one datastore. Each of the plurality of bids has an associated location. At 1302, a first geographic location is selected from the plurality of supply locations. At 1303, a sorted collection of location dependent values is generated. Each of the location dependent values is determined from one of the plurality of bids. At 1304, a map of the collection of location dependent values is output.

Figure 14:
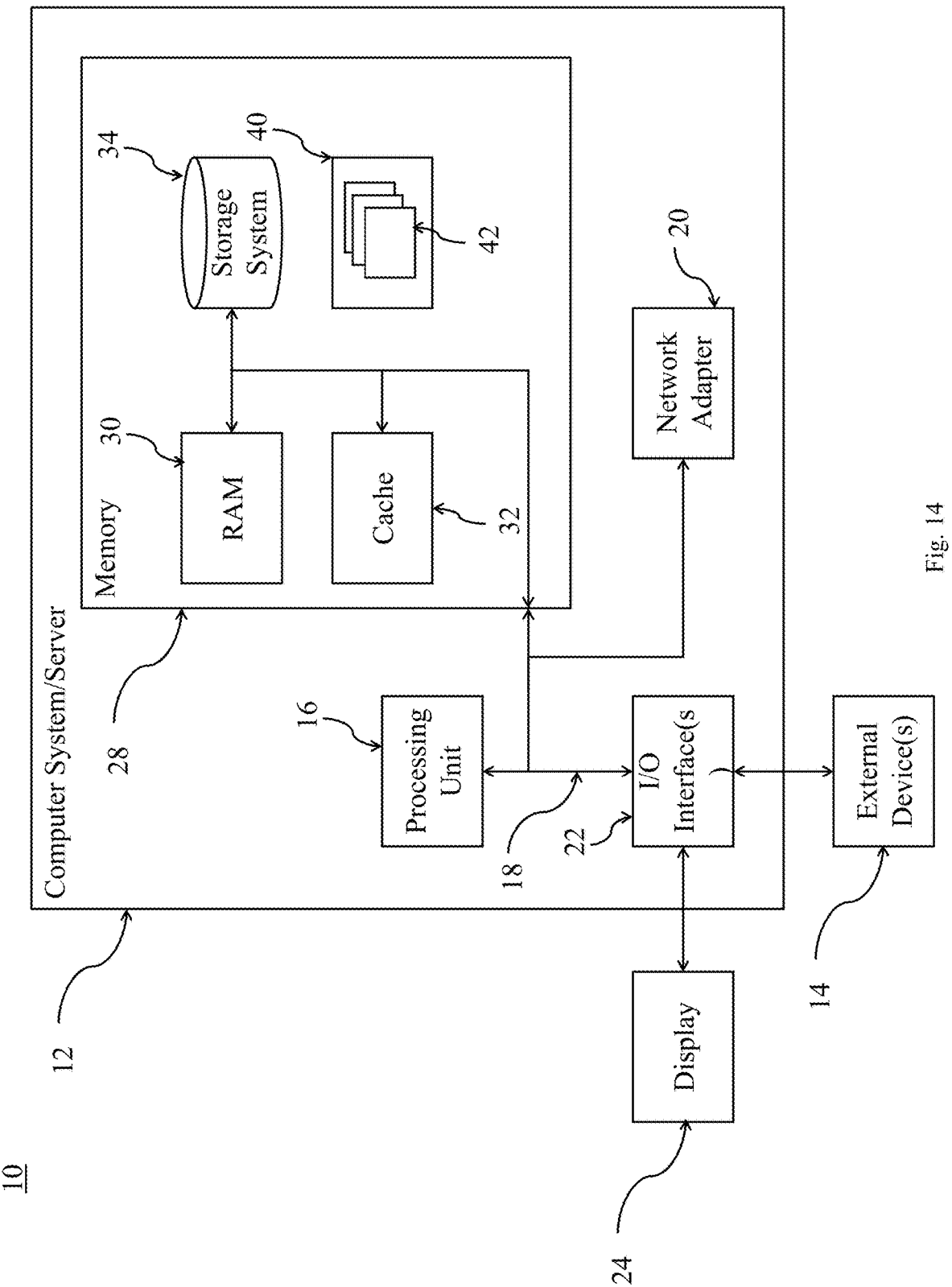
FIG. 14 depicts a computing node according to embodiments of the present disclosure.

Referring now to FIG. 14, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The figures depict various embodiments for purposes of illustration only. One skilled in the art will readily recognize from the following discussion that alternative embodiments of the structures and methods illustrated herein may be employed without departing from the principles described herein. Persons skilled in the relevant art can appreciate that many modifications and variations are possible in light of the above disclosure. For example, while reference is made to the transportation of crop products, in practice the methods of interaction described herein can apply equally to objects, goods, commodities, or products other than crop products (e.g., non-agricultural goods or products). Likewise, the methods of transportation of goods described here can apply equally to transportation by means of truck, rail, ships, etc.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus or system for performing the operations herein. Such an apparatus or system may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, computer readable storage medium and may include any embodiment of a computer program product or other data described herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of generating a visualization of location-dependent values, the method comprising:
   retreiving, using one or more processors, a plurality of bids and a plurality of supply locations from at least one electronic datastore, each of the plurality of bids having an associated location;
   selecting, using the one or more processors, a first geographic location from the plurality of supply locations;
   generating, using the one or more processors, a ball tree, the ball tree being a digital data structure comprising a plurality of nodes, each node of the ball tree comprising a pivot geographic location and a radius, each node corresponding to at least one local value having a location within the radius of the pivot;
   storing, by the one or more processors, a custom-spatial index to computer memory that stores the bids to memory in a manner organized based on the ball tree;
   performing, by the one or more processors, a pruned search, the pruned search being a computerized search using the custom-spatial index, the pruned search comprising:
      traversing, by the one or more processors, the ball tree using the custom-spatial index to generate a sorted collection of location dependent values, each location dependent value of the sorted collection of location dependent values being determined from one of the plurality of bids, wherein traversing the ball tree comprises:
         computing, by the one or more processors, a bound on the location-dependent value for at least one node of the ball tree based on its corresponding at least one local value, its pivot geographic location, and the first geographic location;
         selectively traversing, by the one or more processors, at least one child of the at least one node according to the bound, where leaf nodes not satisfying the bound are pruned from the pruned search and are not processed as part of the computerized search,
         computing, by the one or more processors, the location-dependent value for the at least one child based on its corresponding at least one local value, its pivot geographic location, and the first geographic location, and
         inserting, by the one or more processors, the location dependent value of the at least one child to the sorted collection of location dependent values, the sorted collection of location dependent values having a predetermined size; and
   outputting, by the one or more processors, a map of the sorted collection of location dependent values.

2. The method of claim 1, wherein the first geographic location corresponds to a grower.

3. The method of claim 1, wherein the map comprises a heatmap indicative of each location-dependent value of the sorted collection of location dependent values.

4. The method of claim 1, wherein the map comprises a plot of the plurality of bid locations.

5. The method of claim 1, wherein the location of each local value corresponds to a delivery location.

6. The method of claim 5, wherein each local value corresponds to a bid.

7. The method of claim 1, wherein each location-dependent value of the sorted collection of location dependent values is a basis net of transport.

8. The method of claim 1, wherein computing the bound on each location-dependent value of the sorted collection of location dependent values comprises subtracting a product of an estimated freight rate and an estimated distance between the first geographic location and the location of one of the local values from that local value.

9. The method of claim 8, wherein the estimated freight rate is an estimated lower bound on an actual freight rate.

10. The method of claim 8, wherein the estimated distance is a haversine distance.

11. The method of claim 1, wherein selectively traversing comprises traversing the at least one child when the bound is greater than or equal to a least value in the collection.

12. The method of claim 7, wherein computing each location-dependent value of the sorted collection of location dependent values comprises subtracting a product of an actual freight rate and an actual distance between the first geographic location and the location of one of the local values from that local value.

13. The method of claim 1, further comprising: selecting, in response to user input, a relevant location value of the plurality of relevant location values to display information associated with the relevant location on the map.

14. The method of claim 1, further comprising:
   depicting a region of interest on the map with the locations of best bids marked with a circle indicative of bid rank;
   selecting, in response to user input, a best bid within the region of interest; and
   adjusting, in response to user input, the bid to dynamically update the map and bid information.

15. The method of claim 1, further comprising:
   in response to a change in one or more bid, dynamically updating the map and bid information displayed.

16. A computer program product for sorting location-dependent values, the computer program product comprising a computer readable storage medium having program instructions embodied therewith, the program instructions executable by a processor to cause the processor to perform a method comprising:

reading a plurality of bids and a plurality of supply locations from at least one datastore, each of the plurality of bids having an associated location;

selecting a first geographic location from the plurality of supply locations;

generating a ball tree, the ball tree being a digital data structure comprising a plurality of nodes, each node of the ball tree comprising a pivot geographic location and a radius, each node corresponding to at least one local value having a location within the radius of the pivot;

storing a custom-spatial index to computer memory that stores the bids to memory in a manner organized based on the ball tree;

performing a pruned search, the pruned search being a computerized search using the custom-spatial index, the pruned search comprising:

traversing the ball tree using the custom-spatial index to generate a sorted collection of location dependent values, each location dependent value of the sorted collection of location dependent values being determined from one of the plurality of bids, wherein the traversing ball tree comprises:

computing a bound on the location-dependent value for at least one node of the ball tree based on its corresponding at least one local value, its pivot geographic location, and the first geographic location, selectively traversing at least one child of the at least one node according to the bound, where leaf nodes not satisfying the bound are pruned from the pruned search and are not processed as part of the computerized search, computing the location-dependent value for the at least one child based on its corresponding at least one local value, its pivot geographic location, and the first geographic location, and inserting the location dependent value of the at least one child to the sorted collection of location dependent values, the sorted collection of location dependent values having a predetermined size; and outputting a map of the sorted collection of location dependent values.

17. The computer program product of claim 16, wherein the first geographic location corresponds to a grower.

18. The computer program product of claim 16, wherein the map comprises a heatmap indicative of each location-dependent value of the sorted collection of location dependent values.

19. The computer program product of claim 16, wherein the map comprises a plot of the plurality of bid locations.

20. The computer program product of claim 16, wherein the location of each local value corresponds to a delivery location.

21. The computer program product of claim 20, wherein each local value corresponds to a bid.

22. The computer program product of claim 16, wherein each location-dependent value of the sorted collection of location dependent values is a basis net of transport.

23. The computer program product of claim 16, wherein computing the bound on each location-dependent value of the sorted collection of location dependent values comprises subtracting a product of an estimated freight rate and an estimated distance between the first geographic location and the location of one of the local values from that local value.

24. The computer program product of claim 23, wherein the estimated freight rate is an estimated lower bound on an actual freight rate.

25. The computer program product of claim 23, wherein the estimated distance is a haversine distance.

26. The computer program product of claim 16, wherein selectively traversing comprises traversing the at least one child when the bound is greater than or equal to a least value in the collection.

27. The computer program product of claim 22, wherein computing each location-dependent value of the sorted collection of location dependent values comprises subtracting a product of an actual freight rate and an actual distance between the first geographic location and the location of one of the local values from that local value.

28. The computer program product of claim 16, the method further comprising:

in response to a change in one or more bid, dynamically updating the map and bid information displayed.

29. A system comprising:

a first datastore having stored therein a plurality of bids, each of the plurality of bids having an associated location;

a second datastore having stored therein a plurality of supply locations;

a first computing node comprising one or more processors and memory, the first computing node configured to perform a method comprising:

reading the plurality of bids from the first datastore and the plurality of supply locations from the second datastore;

selecting a first geographic location from the plurality of supply locations;

generating a ball tree, the ball tree being a digital data structure comprising a plurality of nodes, each node of the ball tree comprising a pivot geographic location and a radius, each node corresponding to at least one local value having a location within the radius of the pivot;

storing a custom-spatial index to computer memory that stores the bids to memory in a manner organized based on the ball tree;

performing a pruned search, the pruned search being a computerized search using the custom-spatial index, the pruned search comprising:

traversing the ball tree using the custom-spatial index to generate a sorted collection of location dependent values, each location dependent value of the sorted collection of location dependent values being determined from one of the plurality of bids, wherein traversing the ball tree comprises:

computing a bound on the location-dependent value for at least one node of the ball tree based on its corresponding at least one local value, its pivot geographic location, and the first geographic location, selectively traversing at least one child of the at least one node according to the bound, where leaf nodes not satisfying the bound are pruned from the pruned search and are not processed as part of the computerized search, computing the location-dependent value for the at least one child based on its corresponding at least one local value, its pivot geographic location, and the first geographic location, and inserting the location dependent value of the at least one child to the sorted collection of location dependent values, the sorted collection of location dependent values having a predetermined size; and providing a map of the sorted collection of location dependent values to a second computing node for display on a user interface.

30. The system of claim 29, the method further comprising:

in response to a change in one or more bid, dynamically updating the map and bid information displayed.

* * * * *

UNITED STATES PATENT AND TRADEMARK OFFICE
CERTIFICATE OF CORRECTION

PATENT NO. : 11,978,072 B2
APPLICATION NO. : 18/154643
DATED : May 7, 2024
INVENTOR(S) : Tubilla et al.

It is certified that error appears in the above-identified patent and that said Letters Patent is hereby corrected as shown below:

In the Claims

In Column 17, in Claim 1, Line 32, delete "retreiving," and insert -- retrieving, --, therefor.

Signed and Sealed this
Thirteenth Day of August, 2024

Katherine Kelly Vidal
*Director of the United States Patent and Trademark Office*